United States Patent
Spertus et al.

(10) Patent No.: US 7,634,521 B1
(45) Date of Patent: Dec. 15, 2009

(54) TECHNIQUE FOR SCANNING STEALTHED, LOCKED, AND ENCRYPTED FILES

(75) Inventors: Michael Paul Spertus, Chicago, IL (US); Timothy Michael Naftel, Longmont, CO (US)

(73) Assignee: Symantec Corporation, Mountain view, CA (US)

( * ) Notice: Subject to any disclaimer, the term of this patent is extended or adjusted under 35 U.S.C. 154(b) by 325 days.

(21) Appl. No.: 11/413,455

(22) Filed: Apr. 27, 2006

(51) Int. Cl.
*G06F 17/00* (2006.01)
*G06F 17/30* (2006.01)

(52) U.S. Cl. ............... 707/205; 707/10; 707/9; 726/21; 726/22; 726/26; 726/27; 709/247; 713/189; 713/191

(58) Field of Classification Search .......... None
See application file for complete search history.

(56) References Cited

U.S. PATENT DOCUMENTS

| | | | |
|---|---|---|---|
| 6,851,058 B1 * | 2/2005 | Gartside | 726/24 |
| 7,293,150 B2 * | 11/2007 | Witt et al. | 711/170 |
| 2008/0016304 A1 * | 1/2008 | Witt et al. | 711/162 |
| 2008/0270804 A1 * | 10/2008 | Terranova et al. | 713/189 |

OTHER PUBLICATIONS

WinZip, 1991-2005, WinZip International LLC.*

Nebbett, G., "Windows NT/2000 Native API Reference", Macmillan Technical Publishing, Indianapolis, IN, Jan. 2000, pp. 457-475.

"Encrypting File System in Windows XP and Windows Server 2003", Microsoft Corporation, Aug. 1, 2002, updated Apr. 11, 2003, pp. 1-40 [online]. Retrieved on Feb. 17, 2006. Retrieved from the Internet:<URL:http://www.microsoft.com/technet/prodtechnol/winxppro/deploy/cryptfs.mspx>.

* cited by examiner

*Primary Examiner*—Pierre M Vital
*Assistant Examiner*—Loan T Nguyen
(74) *Attorney, Agent, or Firm*—Gunnison, McKay & Hodgson, L.L.P.; Forrest Gunnison

(57) ABSTRACT

A copy of the raw data on physical disk of an inaccessible source file is automatically generated in an accessible target file. When accessed, the copy of the raw data of the inaccessible source file in the accessible target file can be read allowing a user or application to evaluate the data of the accessible target file, and thus indirectly the raw data of the inaccessible source file. In some embodiments, the copy of the raw data is evaluated for malicious code, allowing a user or application to take protective actions, such as deleting the inaccessible source file. Where the raw data of the inaccessible source file is encrypted, the copy of the raw data is automatically decrypted by the operating system when read yielding unencrypted data. Where the raw data of the inaccessible source file is compressed, the copy of the raw data is automatically decompressed by the operating system when read yielding uncompressed data.

16 Claims, 12 Drawing Sheets

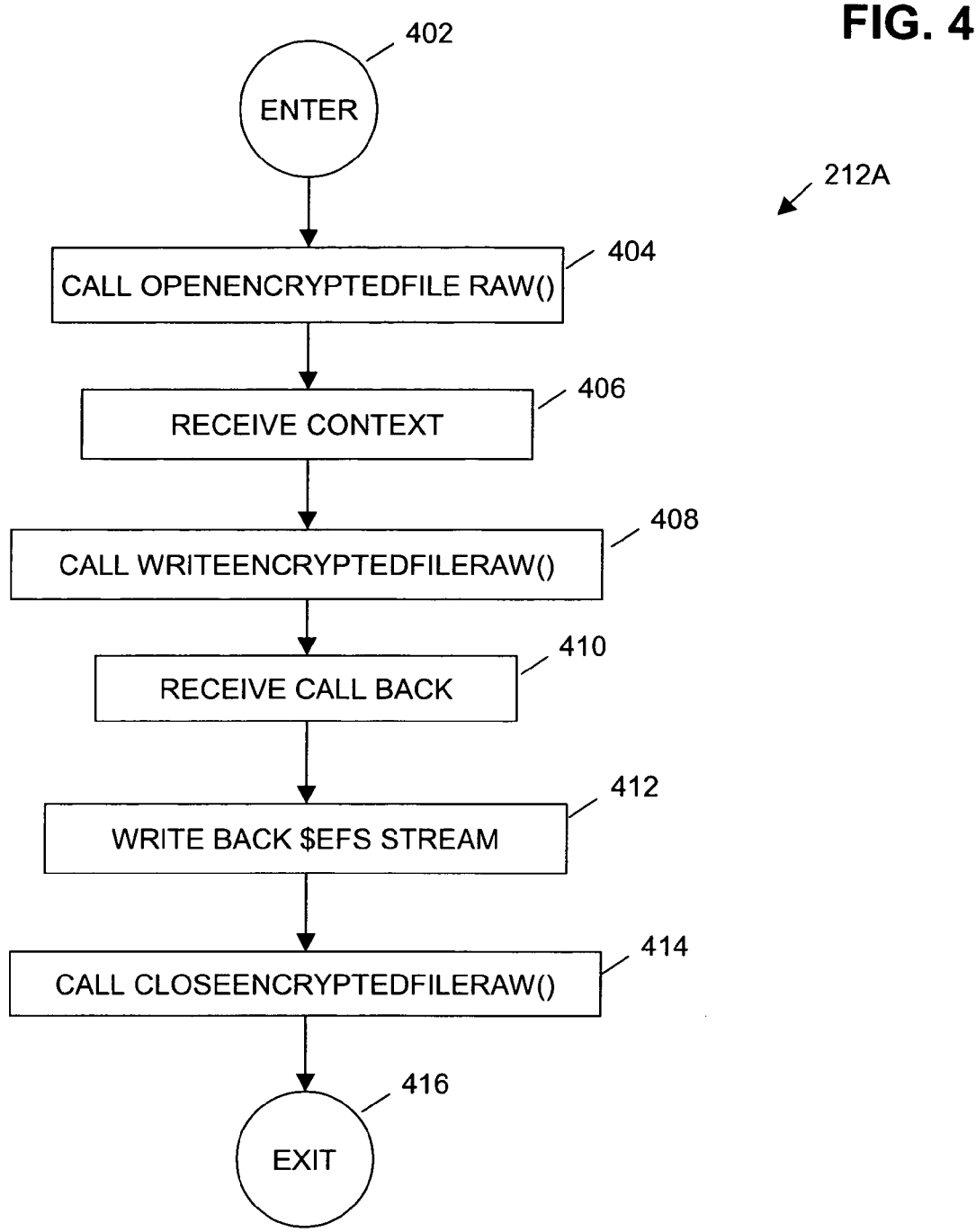

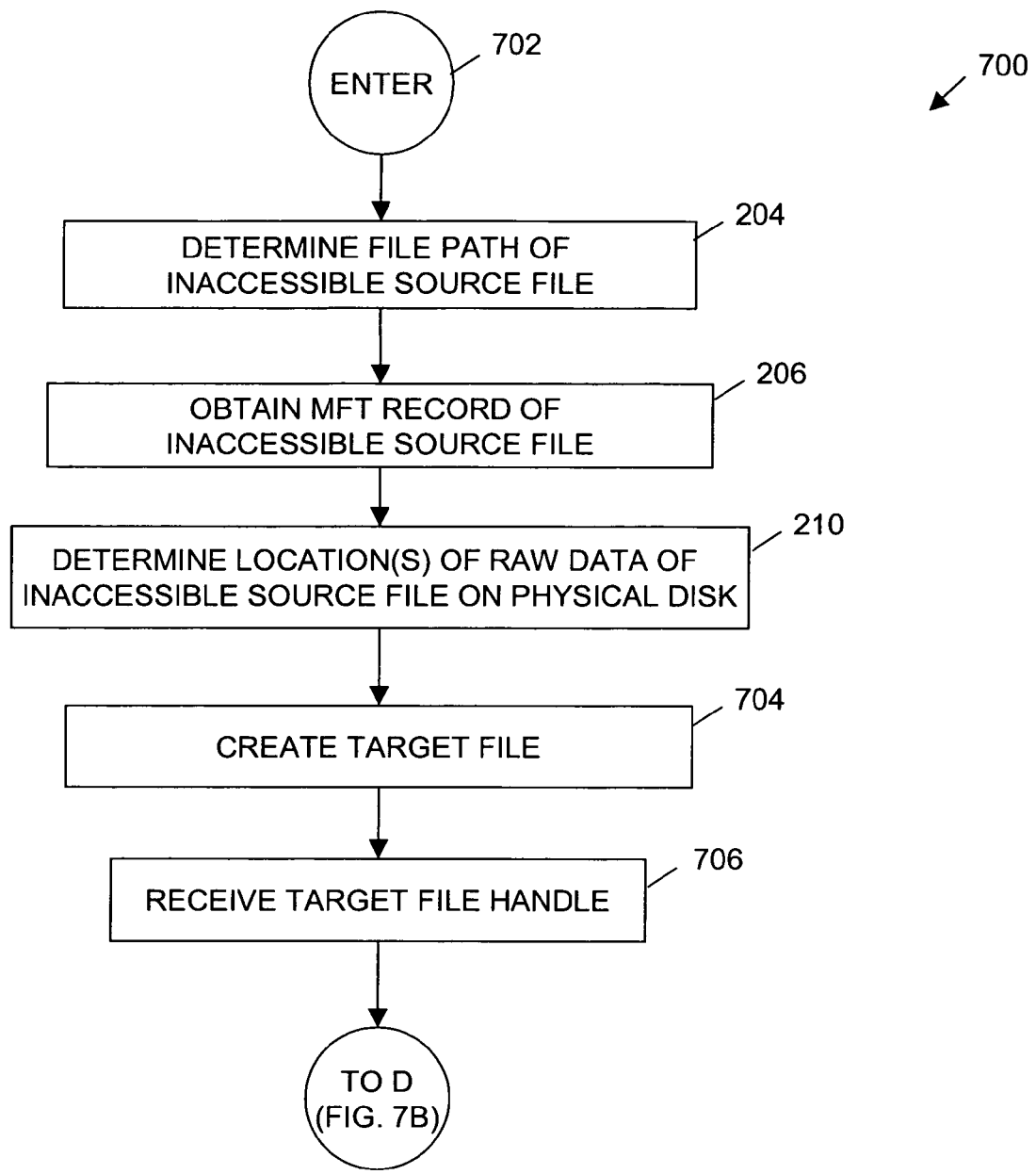

TECHNIQUE FOR SCANNING STEALTHED, LOCKED, AND ENCRYPTED FILES

BACKGROUND OF THE INVENTION

1. Field of the Invention

The present invention relates to computer systems. More particularly, the present invention relates to the detection of malicious code on a computer system.

2. Description of Related Art

Malicious code often stores processes and data in stealthed, e.g., hidden, or locked files to prevent detection, such as by a malicious code detection application. Often the contents of these files are also encrypted or compressed.

SUMMARY OF THE INVENTION

In accordance with one embodiment of the invention, a method includes determining the file path of an inaccessible source file, wherein the contents of the inaccessible source file is stored as raw data at one or more locations on a physical disk of a host computer system. An accessible target file is automatically created, and a copy of the raw data of the inaccessible source file is automatically generated in the accessible target file. When accessed, the copy of the raw data of the inaccessible source file in the accessible target file, i.e., the contents of the accessible target file, can be read allowing a user or application to evaluate the contents of the accessible target file, and thus indirectly the raw data of the inaccessible source file. In some embodiments, the contents of the accessible target file is evaluated for malicious code, allowing a user or application to take protective actions, such as deleting the inaccessible source file.

In some embodiments, the raw data of the inaccessible source file is encrypted data, and an encryption stream utilized for decrypting the raw data of the inaccessible source file is obtained and associated with the accessible target file. When read, the copy of the raw data of the inaccessible source file in the accessible target file is automatically decrypted by the operating system yielding unencrypted data.

In some embodiments, the raw data of the inaccessible source file is compressed data. When read, the copy of the raw data of the inaccessible source file in the accessible target file is automatically decompressed by the operating system yielding decompressed data.

Embodiments described herein are best understood by reference to the following detailed description when read in conjunction with the accompanying drawings.

BRIEF DESCRIPTION OF THE DRAWINGS

FIG. 4 illustrates a flow diagram of a method for creating an accessible target file having an associated MFT record including an encryption stream of an inaccessible source file in accordance with one embodiment of the invention.

Common reference numerals are used throughout the drawings and detailed description to indicate like elements.

DETAILED DESCRIPTION

Figure 1:
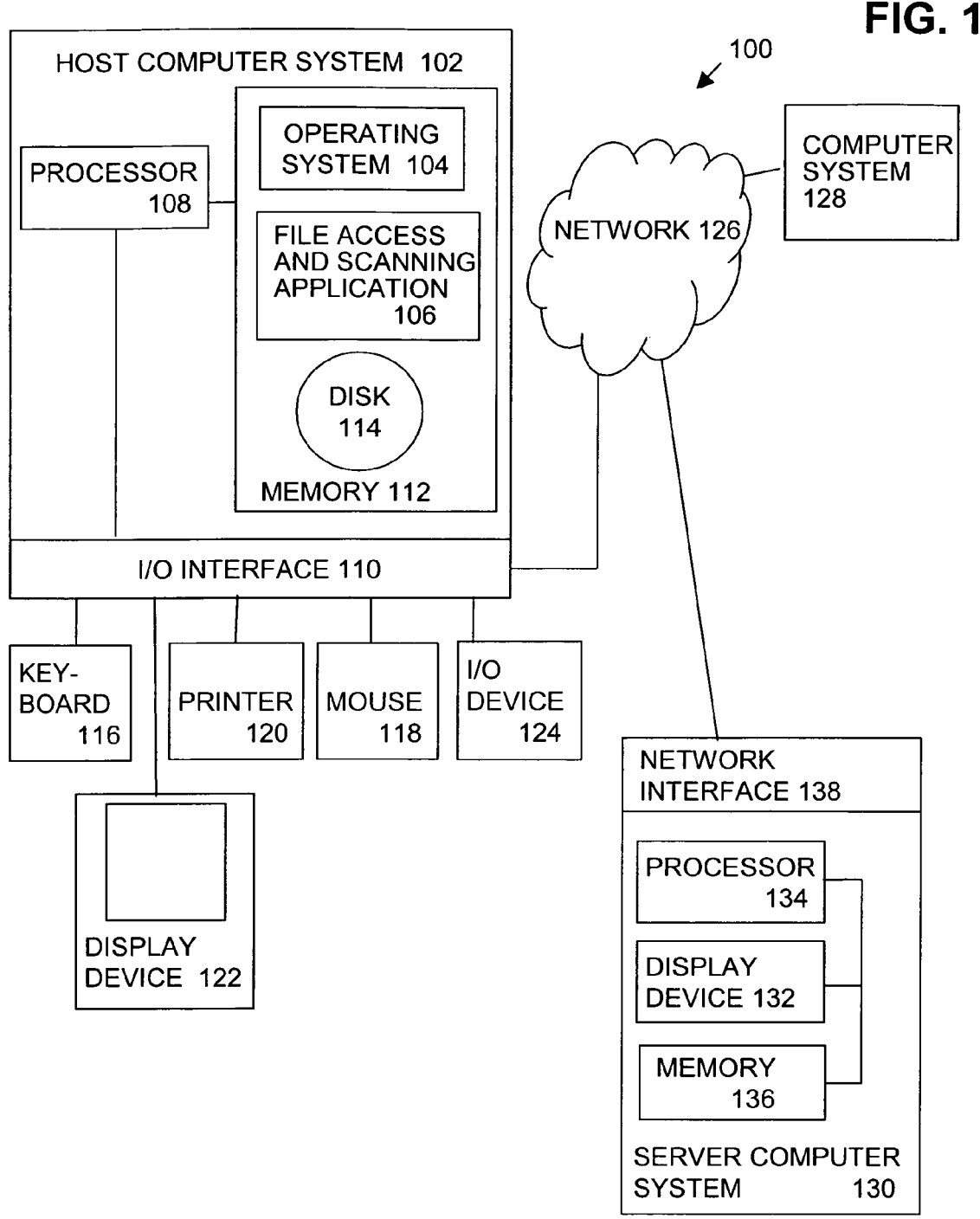
FIG. 1 is a diagram of a client-server system that includes a file access and scanning application executing on a host computer system, e.g., a first computer system, in accordance with one embodiment of the invention.

Scanning encrypted files that have been stealthed and/or locked for malicious code can be very difficult and time consuming, often requiring manual decryption. As used herein, in one embodiment, an encrypted file is a file that is automatically encrypted and decrypted by a file system. Further, as used herein, in one embodiment, a stealthed file is a file that is not visible in a standard directory listing used by an file system due to malicious code that redirects file input/output (I/O) commands to that the file. Additionally, as used herein, in one embodiment, a locked file is a file that is opened for exclusive access and cannot be opened for reading by another process.

In Windows NT operating systems, files can be opened in a variety of ways, such as for shared use or for exclusive use. When a file is opened for shared use, typically another process can access the file through the file system. However, when the file is opened for exclusive use, i.e., not for shared use, typically, another process cannot access the file. For example, malicious code often opens a file with exclusive access so that another process can not access the file through the file system and examine the contents.

When a file is to be accessed through the file system, typically an API function, for example the win32 API function CreateFile( ), is called, and various parameters, such as the file name of the file to be accessed, are passed to the operating system. In response, the operating system locates the file in the standard directory listing and returns a file handle to the file.

When a process has the file handle, the process can open the associated file and seek within the file. Depending on how the file was opened, the process can also perform read and/or write operations on the file. However, when the file cannot be located in the directory listing, or the file has been opened for exclusive access, in response to the call to CreateFile( ), the operating system returns a service denial, such as an access denied error, and the calling process cannot access the file.

Thus, for example, when a malicious code detection scanning application calls CreateFile( ) to obtain a handle to a file that is hidden from the directory listing, or opened for exclusive access, the operating system returns a service denial to the malicious code detection scanning application. Consequently, the malicious code detection scanning application cannot access the file and evaluate the file for malicious code.

Some software products bypass the file system and allow a user to go directly to the locations of the raw data contents of a file on a physical storage disk, and to read the raw data contents of the file from the physical disk. As used herein the raw data of a file, e.g., an inaccessible source file, is the actual data contents of a file as stored on a physical disk, e.g., a hard drive. However, these software products cannot automatically decrypt raw data that is encrypted and/or decompress raw data that is compressed.

For example, some software products, such as VxMS (available from Symantec Corporation, Cupertino, Calif.), allow the file system stack on a Windows NT operating system to be bypassed, and the raw data contents of files on the physical disk to be read and parsed. Generally, with VxMS, the physical disk is viewed as a single flat file, so that the files on the physical disk are available as blocks of data. The data is mapped out, and the locations of the raw data, i.e., the data clusters, for each file is available for reading.

When the raw data of a file is compressed data, the above technique obtains raw data that is still in a compressed state. The operating system does not decompress the compressed raw data from the physical disk. Similarly, when the raw data of a file is encrypted data, the above technique obtains raw data that is still in an encrypted state. The operating system does not decrypt the encrypted raw data from the physical disk.

Consequently even if the raw data of a file is obtained from the physical disk and then provided to a malicious code detection scanning application, if the raw data of the file is encrypted or compressed, the malicious code detection application cannot evaluate the data for malicious code as the data is still in the encrypted or compressed state.

Embodiments in accordance with the present invention, directly access the raw data contents, i.e., the raw data, of an inaccessible source file on a physical disk and automatically generate a copy of the raw data of the inaccessible source file in an accessible target file. As used herein, in one embodiment, an inaccessible source file is a file on a computer system that is a locked file or a stealthed file, as earlier defined.

In one embodiment, when the raw data of the inaccessible source file are encrypted, an accessible target file is automatically generated so that the copy of the encrypted raw data is automatically decrypted by the operating system, and scanned for the presence of malicious code. In one embodiment, when the raw data of the inaccessible source file is compressed, an accessible target file is automatically generated so that the copy of the compressed raw data is automatically decompressed by the operating system, and scanned for the presence of malicious code. In one embodiment, when the raw data of the inaccessible source file is normal data, i.e., not encrypted data and not compressed data, an accessible target file is automatically generated so that the copy of the raw data contents are accessible, and scanned for the presence of malicious code. In some embodiments, upon detection of malicious code, protective action is taken, such as deleting the inaccessible source file.

Referring now to FIG. 1, FIG. 1 is a diagram of a client-server system 100 that includes a file access and scanning application 106 executing on a host computer system 102, e.g., a first computer system, in accordance with one embodiment of the invention. Host computer system 102, sometimes called a client or user device, typically includes a central processing unit (CPU) 108, hereinafter processor 108, an input/output (I/O) interface 110, a memory 112; and a disk 114, e.g., a physical hard disk. In one embodiment, memory 112 includes an operating system 104 such as a page-based virtual memory system that uses pages, e.g., memory areas.

For example, Windows NT are operating systems widely used on home and business computer systems. Windows NT operating systems provide page-based virtual memory management schemes that permit programs to realize a virtual memory address space. In one embodiment, when processor 108 is running in virtual memory mode, all addresses are presumed virtual addresses and are translated, or mapped, to physical addresses each time processor 108 executes a new instruction to access memory.

Conventionally, the virtual memory address space is divided into two parts: a lower user address space, also referred to as user mode address space available for use by a program; and, a high system address space, also referred to as kernel address space, reserved for use by the operating system.

To protect the integrity of the operating system code, and other kernel address space code and data structures from errant or malicious programs, and to provide efficient system security (user rights management), Windows NT operating systems separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities, user mode programs utilize system calls provided in an application program interface (API), e.g., win32dll and Ntdll, which interface between the user mode and kernel mode functions.

Windows NT operating systems typically store data, e.g., the raw data of files, on the physical disk(s) of a computer system, e.g., disk 114, in accordance with the New Technology File System (NTFS). The basic unit of allocation in the NTFS is a data cluster of a specified number of bytes that is also a multiple of a sector size of the physical disk. For example, a NTFS cluster of 4 kilobytes includes eight (8) 512 byte sectors on a physical disk. NTFS addresses data using a cluster number.

The NTFS formats the disk space on a physical disk into volumes. Data is stored in a volume as files. Each NTFS volume has a special file called the Master File Table (MFT) that includes at least one record for each file in the volume. Similar to file records, directory records are also stored in the MFT, however, rather than data, directory records contain index information.

The first sixteen (16) records in an MFT are reserved for special files used by the NTFS. In particular, record 5, also commonly termed index 5, of a MFT is the root directory folder and includes index information for locating a next directory level on the volume in the directory structure. Thus, beginning with record 5, a full path name to a selected file can be indexed through the directory records to determine the location of the record of the selected file on the MFT.

Following the first sixteen (16) reserved records in the MFT, the remaining records on the MFT are for each file and directory on the volume. Generally, a MFT record includes a set of file attributes that represent the file. Elements such as a file's name, the file's security information, and the file's data are file attributes.

Attributes stored in the MFT record are commonly termed resident attributes, and attributes stored outside the MFT record are termed nonresident attributes. When file attributes are too large for the MFT record, the attributes are stored in clusters of disk space outside the MFT structure but within the volume.

The MFT record includes an attribute list, which itself is an attribute, that lists the location of all attributes that reside in other MFT records. When a file is small, an MFT record can include the raw data of the file. In larger files, an MFT record lists the location(s) where all the raw data in the file can be found on the volume.

When a file is an encrypted file, e.g., the raw data contents of the file are encrypted, the MFT record for that file also includes an encryption stream, termed the $EFS stream which is stored in a data attribute in the MFT record. The $EFS stream in the MFT record is used by the operating system, and in particular the Encrypting File System (EFS), in decrypting the encrypted data.

Windows NT operating systems, the NTFS, the MFT, the MFT record and directory structures, and the EFS are all well known to those of skill in the art and are not further described herein in detail to avoid detracting from the principles of the invention.

Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, file access and scanning application 106 is loaded into host computer system 102 via I/O device 124, such as from a CD, DVD or floppy disk containing file access and scanning application 106.

Host computer system 102 is coupled to a server system 130 of client-server system 100 by a network 126. Server system 130 typically includes a display device 132, a processor 134, a memory 136, and a network interface 138.

Further, host computer system 102 can also be coupled to other computer systems, such as a computer system 128, by network 126 over which information can be sent and received. In one embodiment, computer system 128 is similar to host computer system 102 and, for example, includes a central processing unit, an input output (I/O) interface, and a memory. Computer system 128 may further include standard devices like a keyboard, a mouse, a printer, a display device and an I/O device(s).

Network 126 can be any network or network system that is of interest to a user. In various embodiments, network interface 138 and I/O interface 110 include analog modems, digital modems, or a network interface card.

In one embodiment, file access and scanning application 106 is typically stored in memory 112 of host computer system 102 and executed on host computer system 102. The particular type and configuration of host computer system 102, computer system 128, and server system 130 are not essential to the present embodiment.

Herein, in one embodiment, malicious code is defined as any computer program, module, set of modules, or code that enters a computer system environment without an authorized user's knowledge and/or without an authorized user's consent. A computer virus is one example of a malicious code. Herein malicious code can exist in either user mode or kernel mode.

The present invention is described herein with reference to Windows NT operating systems (available from Microsoft Corporation, Redmond Wash.), and to the New Technology File System (NTFS) and the Encrypting File System (EFS) utilized by the Windows NT operating systems. Herein in one embodiment, the term Windows NT operating systems represent and include Windows 2000, Windows XP, Windows 2003 operating systems as well as future releases of Windows operating systems. Those of skill in the art can apply the principles and operations described herein to other operating systems and file systems with modifications as needed by a specific operating system and/or file system. Further, although the API functions are described herein using examples of API functions accessible from user mode, e.g., win32 API, in other embodiments, equivalent API functions accessible from kernel mode can also be used, e.g., NTOS functions.

Figure 2A:
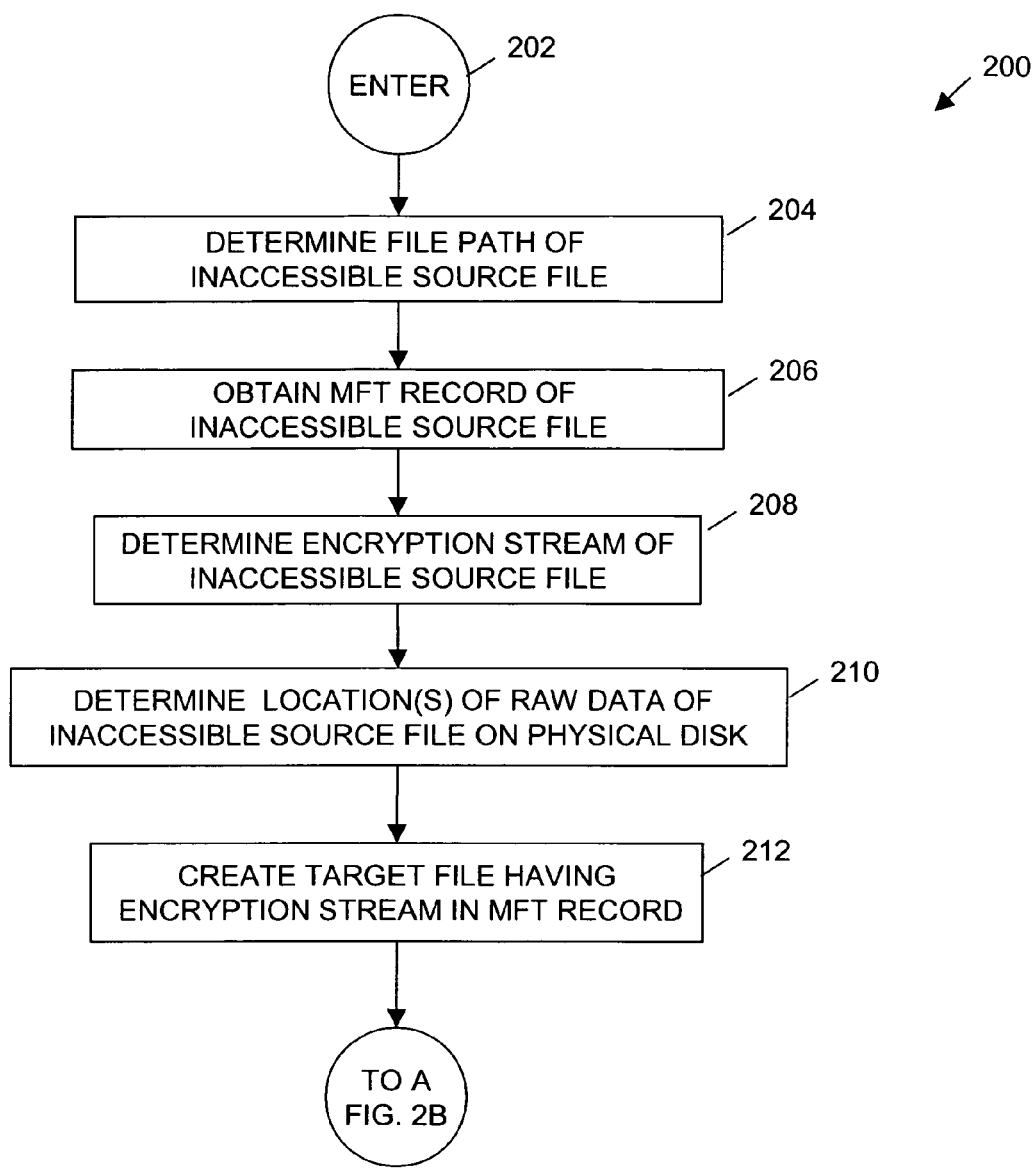
FIG. 2 is a key to FIGS. 2A, 2B, and 2C and illustrates a flow diagram of a method for generating an accessible copy of an encrypted inaccessible source file and scanning the accessible copy for malicious code in accordance with one embodiment of the invention.
Figure 2B:
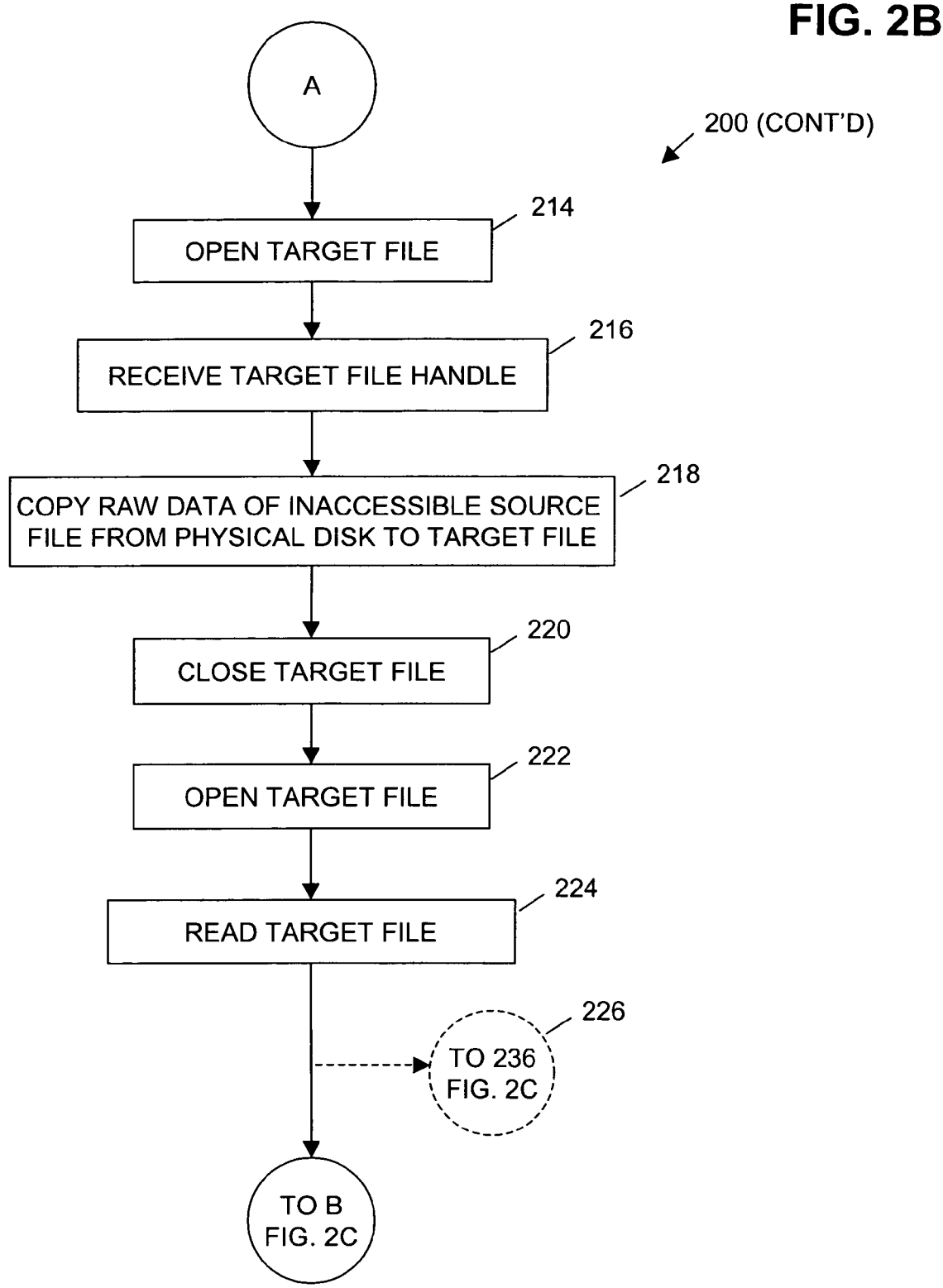
Figure 2C:
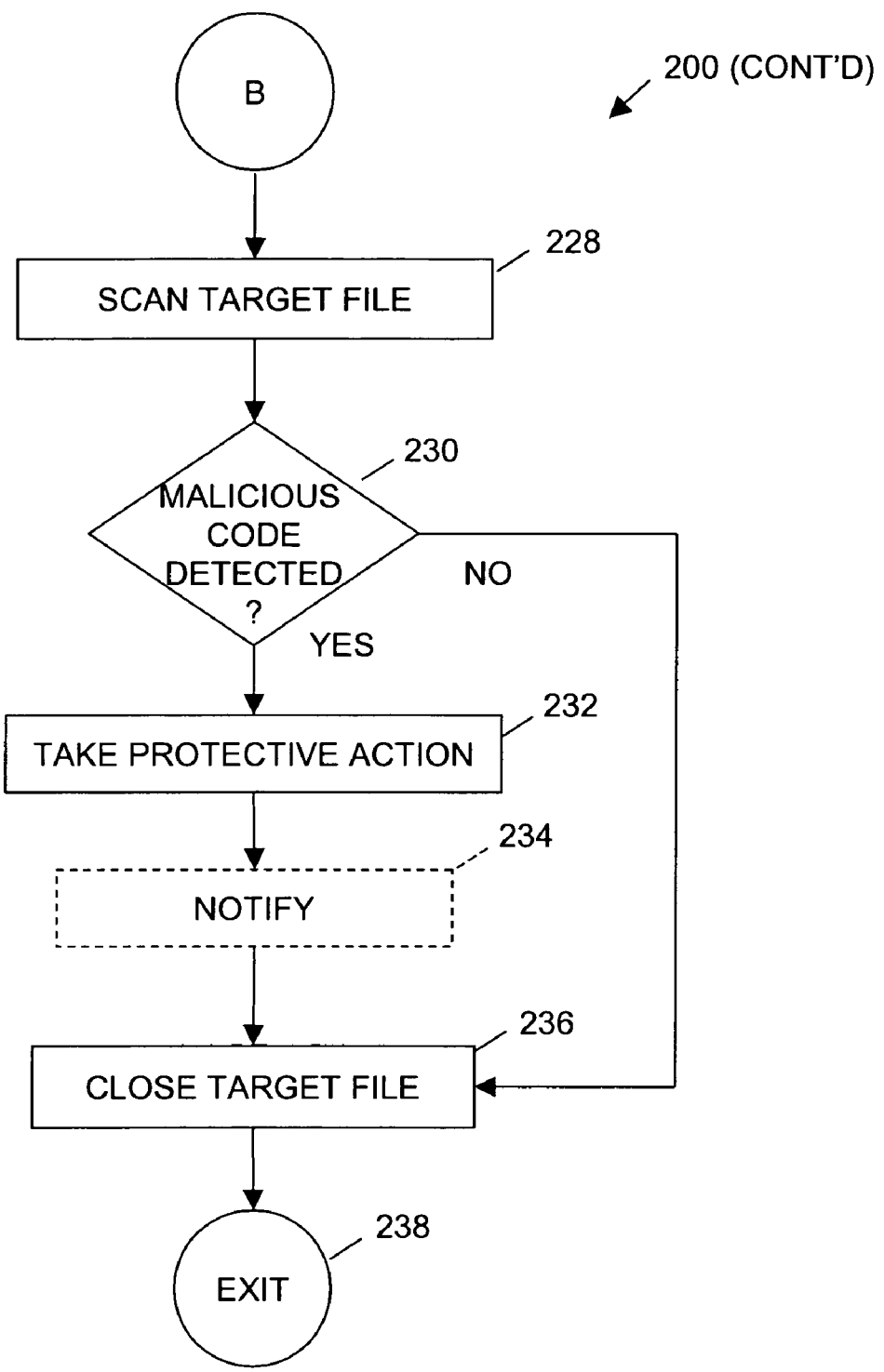

More particularly, FIG. 2 is a key to FIGS. 2A, 2B, and 2C and illustrates a flow diagram of a method 200 for generating an accessible copy of an encrypted inaccessible source file and scanning the accessible copy for malicious code in accordance with one embodiment of the invention. Referring now to FIGS. 1 and 2 together, in one embodiment, execution of file access and scanning application 106 by processor 108 results in the operations of method 200 as described below.

In one embodiment, method 200 is entered at an ENTER operation 202, and from ENTER operation 202, processing transitions to a DETERMINE FILE PATH OF INACCESSIBLE SOURCE FILE operation 204.

In DETERMINE FILE PATH OF INACCESSIBLE SOURCE FILE operation 204, the file path of an inaccessible source file is determined. In the present embodiment, the inaccessible source file is an encrypted inaccessible source file. As used herein in one embodiment, an encrypted inaccessible source file is an inaccessible source file having raw data, i.e., a raw data contents, in an encrypted state.

In one embodiment, the file path of an inaccessible source file, e.g., an encrypted inaccessible source file, is a series of separated strings of characters that uniquely identifies the location of the inaccessible source file in a file system used by the operating system. Conventionally, each of the separated strings of characters represents a directory level in the file system, with the final string of characters representing the file name of the inaccessible source file.

In one embodiment, the file path of the encrypted inaccessible source file is provided to, or otherwise detected, by file access and scanning application 106. For example, in one embodiment, an application, such as a malicious code detection application receives a service denial on attempting to access the encrypted inaccessible source file on host computer system 102 and provides the file path of the encrypted inaccessible source file to file access and scanning application 106.

For purposes of description, assume as an example, that the file path of the encrypted inaccessible source file is "C:\test\foo.txt". From DETERMINE FILE PATH OF INACCESSIBLE SOURCE FILE operation 204, processing transitions to an OBTAIN MFT RECORD OF INACCESSIBLE SOURCE FILE operation 206.

In OBTAIN MFT RECORD OF INACCESSIBLE SOURCE FILE operation 206, the Master File Table (MFT) record associated with the inaccessible source file is obtained. In the present embodiment, the MFT record associated with the encrypted inaccessible source file is obtained. As earlier described, a physical disk, e.g., disk 114, is typically divided by the NTFS into multiple volumes, with each volume having a special file, termed the MFT. The MFT includes at least one MFT record for each file stored on the volume and further includes MFT records for each directory file stored on the volume.

In one embodiment, a handle is obtained to a particular volume of the physical disk on which the inaccessible source file is stored. The directory structure of the MFT is searched until the MFT record associated with the encrypted inaccessible source file is located and obtained.

The MFT record stores the raw data of the inaccessible source file, or stores information describing one or more locations on the volume of the physical disk, e.g., physical disk 114, at which the raw data of the encrypted inaccessible source file is located. One method for obtaining the MFT record of an inaccessible source file is further described herein with reference to FIG. 3.

Figure 3A:
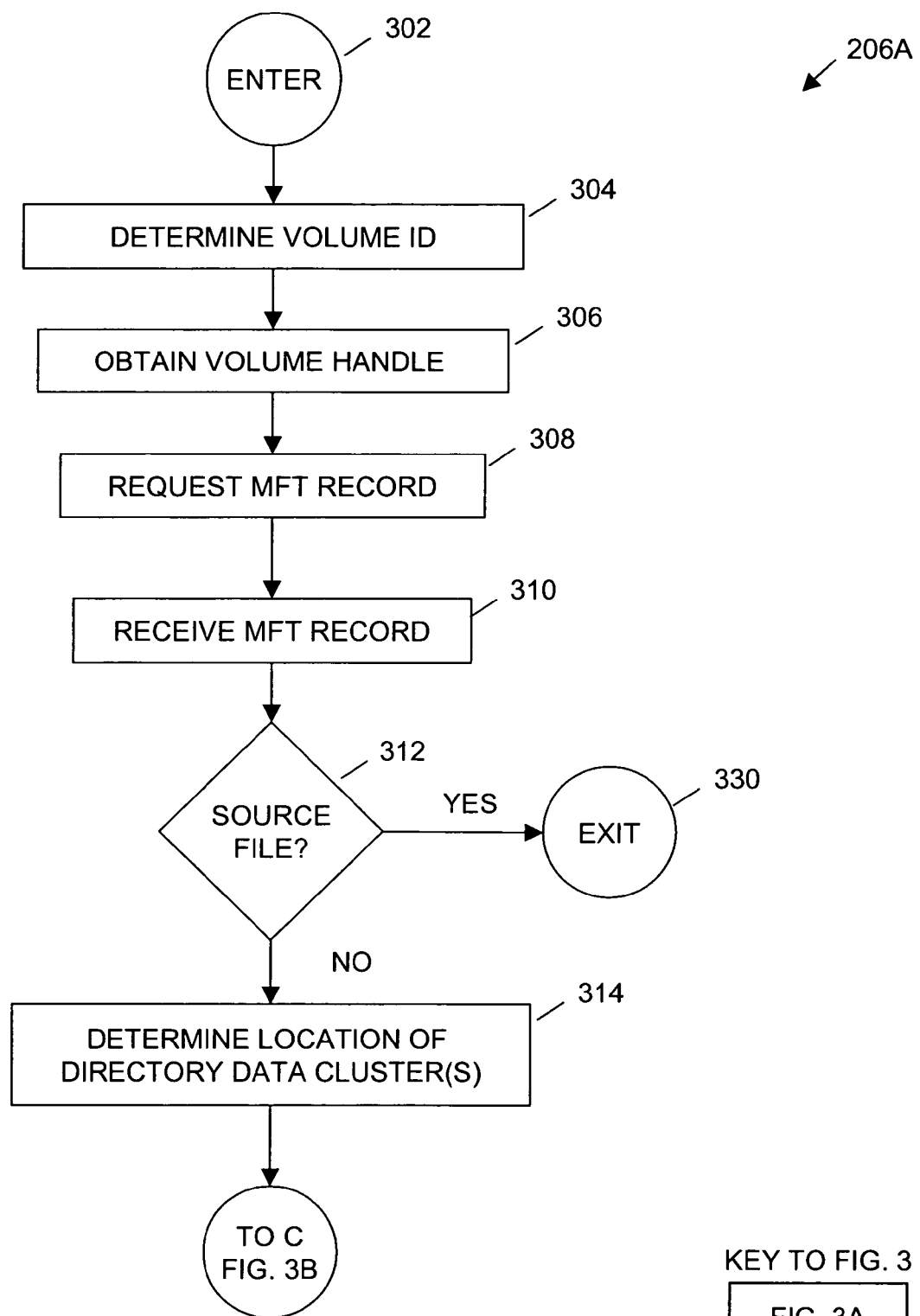
FIG. 3 is a key to FIGS. 3A and 3B and illustrates a flow diagram of a method for obtaining a Master File Table (MFT) record of an inaccessible source file in accordance with one embodiment of the invention.
Figure 3B:
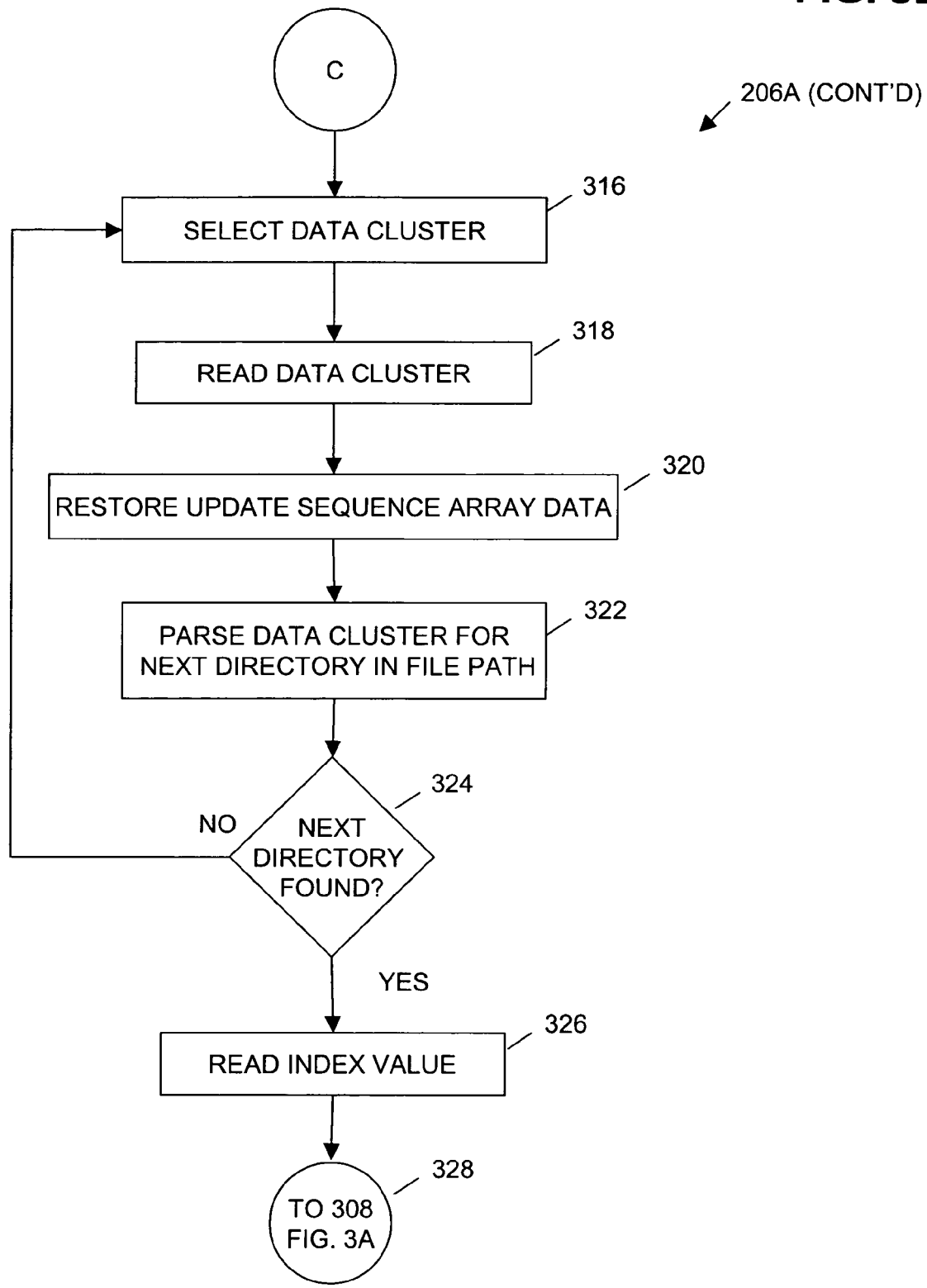

FIG. 3 is a key to FIGS. 3A and 3B and illustrates a flow diagram of a method 206A for obtaining an MFT record of an inaccessible source file in accordance with one embodiment of the invention. As earlier described, the Master File Table is a special file on a volume that describes the files stored on the volume. The Master File Table is a zero (0) based structure typically divided into one kilobyte (1,024 bytes) records.

In one embodiment, the particular one kilobyte MFT record(s) associated with an inaccessible source file is located by parsing through the file path of the inaccessible source file and locating the MFT record associated with the inaccessible source file through the directory structure of the MFT as further described below.

Referring now to FIGS. 2 and 3 together, in one embodiment, execution of file access and scanning application 106 by processor 108 results in the operations of method 206A as described below. In one embodiment, method 206A is entered from operation 204 (FIG. 2A) at an ENTER operation 302, and from ENTER operation 302, processing transitions to a DETERMINE VOLUME ID operation 304.

In DETERMINE VOLUME ID operation 304, in one embodiment, the volume identifier (ID) of the volume on which inaccessible source file is stored is determined. For example, in the example file path "C:\test\foo.txt", the volume is "C". In one embodiment, file access and scanning application 106 queries the operating system for the volume ID of volume "C". The operating system determines the volume ID and returns the volume ID to file access and scanning application 106.

For purposes of description assume for example the volume ID returned by the operating system for volume "C" is "Volume{4062072a-351b-11da-8451-806d6172696f}". Determining a volume ID for a volume in the NTFS for a main directory structure is well known to those of skill in the art and not further described herein to avoid detracting from the principles of the invention. From DETERMINE VOLUME ID operation 304, processing transitions to an OBTAIN VOLUME HANDLE operation 306.

In OBTAIN VOLUME HANDLE operation 306, in one embodiment, a call is made to the operating system to receive a handle to the volume identified by the volume ID obtained in operation 304. In one embodiment, the API function CreateFile( ) is called specifying the volume ID, e.g., "Volume{4062072a-351b-11da-8451-806d6172696f}".

The operating system returns a handle to the volume, herein also termed the volume handle, to file access and scanning application 106. In the present example, the operating system returns a handle to volume 1. From OBTAIN VOLUME HANDLE operation 306, processing transitions to a REQUEST MFT RECORD operation 308.

In REQUEST MFT RECORD operation 308, the operating system is called to open the specified volume and to return a specified MFT record. In one embodiment, the function DeviceIOControl is called specifying the volume handle, the control parameter FSCTL_GET_NTFS_FILE_RECORD, and the index number associated with a particular MFT record. The control parameter FSCTL_GET_NTFS_FILE_RECORD specifies that the operating system is to locate a MFT record for a file at a specified index number, and return the record. In some embodiments, additional input parameters can also be specified.

In one embodiment, initially, index 5, the root directory MFT record of a volume is specified. Index 5 of the MFT is a hard coded index well known to those of skill in the art. Generally viewed, index 5 represents the root directory on the volume, e.g., the first "\" in the file path, and includes a data attribute that specifies the data clusters containing index information for the next lower level in the directory structure of the volume.

The operating system opens the specified volume, locates the MFT record at index 5, and returns the MFT record for index 5. In one embodiment, one MFT record is returned per call to DeviceIOControl. From REQUEST MFT RECORD operation 308, processing transitions to a RECEIVE MFT RECORD operation 310.

In RECEIVE MFT RECORD operation 310, file access and scanning application 106 receives the MFT directory record requested in operation 308. Initially, the MFT directory record returned is the MFT directory record at index 5 of the volume. From RECEIVE MFT RECORD operation 310, processing transitions to a SOURCE FILE check operation 312.

In SOURCE FILE check operation 312, a determination is made whether the MFT record received in operation 310 is the MFT record of the inaccessible source file. In particular, in one embodiment, a determination is made whether the MFT record received in operation 310 corresponds to the last string in the file path representing the inaccessible source file, e.g., "foo.txt".

When the MFT record received in operation 310 corresponds to the last string in the file path ("YES"), e.g., "foo.txt", the MFT record of the inaccessible source file is obtained. The search for the MFT record of the inaccessible source file is completed, and from SOURCE FILE check operation 312, processing exits method 206A at EXIT operation 330 and returns to method 200 at operation 208.

Alternatively, when the MFT record received in operation 310 does not correspond to the last string in the file path, and thus is not the MFT record of the inaccessible source file, the directory structure of the MFT is further searched until the MFT record of the inaccessible source file is obtained. Thus, in one embodiment, when the MFT record received in operation 310 does not correspond to the last string in the file path ("NO"), from SOURCE FILE check operation 312, processing transitions to a DETERMINE LOCATION(S) OF DIRECTORY DATA CLUSTER(S) operation 314.

In DETERMINE LOCATION(S) OF DIRECTORY DATA CLUSTER(S) operation 314, the locations of the directory data clusters on the physical disk associated with the MFT record are determined. In one embodiment, the directory data clusters are identified in the data attribute of the MFT record. Determination of a location of a data cluster from an MFT record is well known to those of skill in the art and not further described in detail to avoid detracting from the principles of the invention. From DETERMINE LOCATION (S) OF DIRECTORY DATA CLUSTER(S) operation 314, processing transitions to a SELECT DATA CLUSTER operation 316.

In SELECT DATA CLUSTER operation 316, a directory data cluster is selected. In one embodiment, initially a first directory data cluster at a first location obtained in operation 314 is selected for reading. From SELECT DATA CLUSTER operation 316, processing transitions to a READ DATA CLUSTER operation 318.

In READ DATA CLUSTER operation 318, the directory data cluster selected in operation 316 is read. The data as read from the directory data cluster, however, is modified from original data due to an update sequence array error checking process used by the NTFS on directory data clusters.

In particular, in order to read the original data of the directory data cluster, the data in the directory data cluster needs to be modified with associated data located in an update sequence array. From READ DATA CLUSTER operation 318 processing transitions to a RESTORE UPDATE SEQUENCE ARRAY DATA operation 320.

In RESTORE UPDATE SEQUENCE ARRAY DATA operation 320, the data in the directory data cluster is modified with associated update sequence array data that was originally part of the data stored in the directory data cluster. In particular, in one embodiment, the last two bytes of each sector of the directory data cluster are replaced with the original 2 bytes stored in the update sequence array structure to yield the original data of the directory data cluster. On method for restoring the data in a data cluster from the update sequence array is further described herein with reference to method 320A and FIG. 6.

When the data of the directory data cluster is restored from the update sequence array, the data of the directory cluster can now be evaluated to determine an index value associated with the next lower level of the file path. Thus from RESTORE UPDATE SEQUENCE ARRAY DATA operation 320, processing transitions to a PARSE DATA CLUSTER FOR NEXT DIRECTORY IN FILE PATH operation 322.

In PARSE DATA CLUSTER FOR NEXT DIRECTORY IN FILE PATH operation 322, the restored data of the directory data cluster is parsed for the next lower directory in the file path. In one embodiment, the restored data of the directory data cluster is parsed for the string representing the next lower directory in the file path.

Continuing the present example, the MFT record for the root directory, i.e., index 5, contains index entries for the next lower level directories, e.g., those directories below "C", on volume 1. Thus, in one embodiment, the directory data cluster is parsed for an entry associated with the next lower directory level in the file path, the string "test". From PARSE DATA CLUSTER FOR NEXT DIRECTORY IN FILE PATH operation 322, processing transitions to a NEXT DIRECTORY FOUND check operation 324.

In NEXT DIRECTORY FOUND check operation 324, a determination is made whether the directory data cluster contains the next lower directory in the file path. In one embodiment, a determination is made whether the directory data cluster contains the string corresponding to the next lower directory in the file path. For example, a determination is made whether the directory data cluster contains an entry corresponding to the string "test".

If the data cluster does not contain an entry corresponding to the next lower directory in the file path ("NO"), processing transitions from NEXT DIRECTORY FOUND check operation 324 and returns to operation 316 with a next directory data cluster at a next location being selected in order from the locations obtained in operation 314.

Alternatively, when the directory data cluster contains an entry corresponding to the next lower directory in the file path ("YES"), processing transitions from NEXT DIRECTORY FOUND check operation 324 to a READ INDEX VALUE operation 326.

In READ INDEX VALUE operation 326, the index value associated with the entry for the next lower directory in the file path is read. For example, the index value associated with the entry for the string "test" is read. For purposes of description, as an example, the index value associated with the entry for the string "test" is assumed to have the index value 1000.

The index value represents the index, e.g., offset, in the volume at which the MFT record for the directory "test" is located. From READ INDEX VALUE operation 326, processing returns at operation 328, to operation 308 (FIG. 3A), with the index value obtained in operation 326, e.g., index 1000, being specified as the next MFT record to be requested.

Operations 308 through 330 are similarly performed as earlier described until the MFT record of the inaccessible source file is obtained. For example, continuing the example, at operation 308, the MFT record at index 1000 is next requested, rather than index 5.

At operation 310, the MFT record at index 1000 is returned. The MFT record at index 1000 represents the directory for the file path string "test" and includes a data attribute that specifies the data clusters containing index information for the next lower level in the directory structure of the volume.

At operation 312 a determination is made whether the MFT record corresponds to the last string in the file path, i.e., the inaccessible source file. As the MFT directory record corresponds to the directory "test" and not "foo.txt", the MFT record does not correspond to the last string in the file path ("NO") and thus processing continues to operation 314.

In operation 314 the locations of the directory data clusters are determined and at operations 316 through 324 the directory data clusters are read, restored with update sequence array data, and then searched for the next string in the file path, e.g., "foo.txt". When the entry for the string "foo.txt" is located, at operation 326, the index value is read.

For example, assume an index value 2000 is read for the string "foo.txt". Thus, processing again returns to operation 308, and index 2000 is next requested rather than index 1000. At operation 310, the MFT record at index 2000 is returned.

The MFT record at index 2000 represents the MFT record for the file path string "foo.txt". At operation 312, a determination is made whether the MFT record corresponds to the last string in the file path. As the MFT record corresponds to the last string in the file path, e.g., "foo.txt", ("YES"), the MFT record of the encrypted inaccessible source file is obtained. From operation 312, processing exits method 206A at operation 330 and returns to method 200 with processing transitioning from OBTAIN MFT RECORD OF INACCESSIBLE SOURCE FILE operation 206 to a DETERMINE ENCRYPTION STREAM OF INACCESSIBLE SOURCE FILE operation 208.

In DETERMINE ENCRYPTION STREAM OF INACCESSIBLE SOURCE FILE operation 208, the encryption stream associated with the encrypted inaccessible source file is determined from the MFT record obtained in operation 206. In one embodiment, the encryption stream is the $EFS stream in the MFT record. In one embodiment, the MFT record of the encrypted inaccessible source file is read and parsed, and the $EFS stream is determined from a data attribute of the MFT record.

The $EFS stream is a Windows alternate data stream that the operating system uses to decrypt the data of the encrypted inaccessible source file. From DETERMINE ENCRYPTION STREAM OF INACCESSIBLE SOURCE FILE operation 208, processing transitions to a DETERMINE LOCATION (S) OF RAW DATA OF INACCESSIBLE SOURCE FILE ON PHYSICAL DISK operation 210.

In DETERMINE LOCATION(S) OF RAW DATA OF INACCESSIBLE SOURCE FILE ON PHYSICAL DISK operation 210, the locations associated with the raw data of the inaccessible source file are determined from the MFT record obtained in operation 206. In one embodiment, the MFT record of the encrypted inaccessible source file is read and parsed, and the locations of the raw data that compose the encrypted inaccessible source file are determined from the data attribute in the MFT record.

Thus, the locations of the raw data composing the encrypted inaccessible source file on the volume of the physical disk, e.g., disk 114, have been located, and the $EFS stream needed to decrypt the raw data is determined. From DETERMINE LOCATION(S) OF RAW DATA OF INACCESSIBLE SOURCE FILE ON PHYSICAL DISK operation 210, processing transitions to a CREATE TARGET FILE HAVING ENCRYPTION STREAM IN MFT RECORD operation 212.

In CREATE TARGET FILE HAVING ENCRYPTION STREAM IN MFT RECORD operation 212, a target file having an encryption stream in an associated MFT record is created. In one embodiment, a target file having an $EFS stream in an associated MFT record is created.

In particular, in one embodiment, the Encrypting File System (EFS) API functions used for reading and writing encrypted files and leaving the encrypted files in an encrypted state are used in creating the target file so that the target file is an encrypted file having an $EFS stream in an associated MFT record. The EFS API functions are typically used by Windows NT operating systems for backup and restore operations. Creation of a target file having a $EFS stream in an associated MFT record is further described herein with reference to FIG. 4.

FIG. 4 illustrates a flow diagram of a method 212A for creating an accessible target file having an associated MFT record including the encryption stream of an inaccessible source file in accordance with one embodiment of the invention. Referring now to FIGS. 2 and 4 together, in one embodiment, execution of file access and scanning application 106 by processor 108 results in the operations of method 212A as described below. In one embodiment, method 212A is entered from operation 210 (FIG. 2A) at an ENTER operation 402, and from ENTER operation 402, processing transitions to a CALL OPENENCRYPTEDFILERAW( ) operation 404.

In CALL OPENENCRYPTEDFILERAW( ) operation 404, a target file is opened. In particular, in one embodiment, the EFS API function OpenEncryptedFileRaw( ) is called specifying the control CREATE_FOR_IMPORT and a target file name, for example "C:\test\fool.txt". In one embodiment, the file name is specified as a fully qualified file path. The control CREATE_FOR_IMPORT specifies that a file, i.e., the target file, be created to allow import of data.

The operating system creates a file, i.e., the target file, and also generates an MFT record associated with the target file. From CALL OPENENCRYPTEDFILERAW( )operation 404, processing transitions to a RECEIVE CONTEXT operation 406.

In RECEIVE CONTEXT operation 406, a context returned from the operating system is received. In one embodiment, the operating system returns a context that is used in subsequent calls to the target file. In particular, in one embodiment, the context is used to write the $EFS stream to the MFT record associated with the target file. From RECEIVE CONTEXT operation 406, processing transitions to a CALL WRITEENCRYPTEDFILERAW( ) operation 408.

In CALL WRITEENCRYPTEDFILERAW( ) operation 408, the EFS API function WriteEncryptedFileRaw( ) is called. In particular in one embodiment, WriteEncryptedFileRaw( ) is called specifying the address of the procedure for call back, herein termed the call back address. In one embodiment, the call back address is an address of a process of file access and scanning application 106. The operating system uses the call back address to call back to file access and scanning application 106. From CALL WRITEENCRYPTEDFILERAW( ) operation 408, processing transitions to a RECEIVE CALL BACK operation 410.

In RECEIVE CALL BACK operation 410, a call back is received by file access and scanning application 106. From RECEIVE CALL BACK operation 410, processing transitions to a WRITE BACK $EFS STREAM operation 412.

In WRITE BACK $EFS STREAM operation 412, the $EFS STREAM obtained in operation 208 (FIG. 2A) is written back to the operating system. In particular, in one embodiment the $EFS stream obtained in operation 208 is encapsulated with an EFS header structure that is written back to the operating system.

In one embodiment, structures sent in the returned context are returned in the EFS header structure with the $EFS stream in the call back to WriteEncryptedFileRaw( ) to recreate an encrypted file and add the $EFS stream to the MFT record for the target file.

In one embodiment, the structures that make up the EFS header structure for the $EFS stream are:

```
struct ENCRYPTION_HEADER
{
        int        version;         // set to 0x00000100.
        wchar_t    signature[4];    // set to 'ROBS', not null
terminated.
        Int        unknown1;        // set to 0x00000000.
        Int        unknown2;        // set to 0x00000000.
};
struct ENCRYPTION_STREAM_NAME
{
        int        size;            // size of this structure
and name.
        wchar_t    signature[4];    //set to 'NTFS', not null
terminated.
        Int        unknown1;        // set to 0x00000000.
        Int        unknown2;        // set to 0x00000000.
        Int        unknown3;        // set to 0x00000000.
        Int        nameSize;        // size in bytes of the
stream name.
$EFS is set to 0x00000002
        char       name[2];         // variable length stream
name.
$EFS is two bytes 0x10 0x19.
};
struct ENCRYPTION_STREAM_DATA
{
        int        size;            // size of this structure
and $EFS
data.
        wchar_t    signature[4];    // set to 'GURE', not
null
terminated.
        Int        unknown1;        // set to 0x00000000.
};
struct ENCRYPTED_EFS
{
        ENCRYPTION_HEADER           header;
        ENCRYPTION_STREAM_NAME      name;
        ENCRYPTION_STREAM_DATA      data;
};
```

From WRITE BACK $EFS STREAM operation 412, processing transitions to a CALL CLOSEENCRYPTEDFILERAW( ) operation 414.

In CALL CLOSEENCRYPTEDFILERAW( ) operation 414, the EFS API CloseEncryptedFileRaw( ) is called, and the operating system closes the target file. In the present embodiment, the target file is initially of zero (0) length with a $EFS stream set in the associated MFT record entry. From CALL CLOSEENCRYPTEDFILERAW( ) operation 414, processing exits method 400 and returns to method 200 with processing transitioning from CREATE TARGET FILE HAVING ENCRYPTION STREAM IN MFT RECORD operation 212 to an OPEN TARGET FILE operation 214.

In OPEN TARGET FILE operation 214, the target file created in operation 212 is opened so that the raw data of the inaccessible source file can be written from the physical disk to the target file. In particular in one embodiment, the API function CreateFile( ) is called to open the target file in order to receive a handle to the target file. In one embodiment, CreateFile( ) is called specifying the target file name, e.g., "C:\test\fool.txt". From OPEN TARGET FILE operation 214, processing transitions to a RECEIVE TARGET FILE HANDLE operation 216.

In RECEIVE TARGET FILE HANDLE operation 216, the operating system returns a handle to the target file, herein termed the target file handle. The target file handle can now be used to copy the raw data of the encrypted inaccessible source file from the physical disk to the accessible target file. From RECEIVE TARGET FILE HANDLE operation 216, processing transitions to a COPY RAW DATA OF INACCESSIBLE SOURCE FILE FROM PHYSICAL DISK TO TARGET FILE operation 218.

In COPY RAW DATA OF INACCESSIBLE SOURCE FILE FROM PHYSICAL DISK TO TARGET FILE operation 218, the raw data of the inaccessible source file is copied from the physical disk, e.g., disk 114, to the accessible target file. More particularly, in one embodiment, raw data at each of the data clusters that compose the contents of the encrypted inaccessible source file are read from the physical disk and written to the accessible target file until a complete copy of the raw data of the encrypted inaccessible source file is created in the accessible target file. In one embodiment, the reads and writes are performed in order of the data clusters. One example of a method for copying the raw data of an inaccessible source file from physical disk to a target file is further described with reference to FIG. 5 and method 500.

Figure 5:
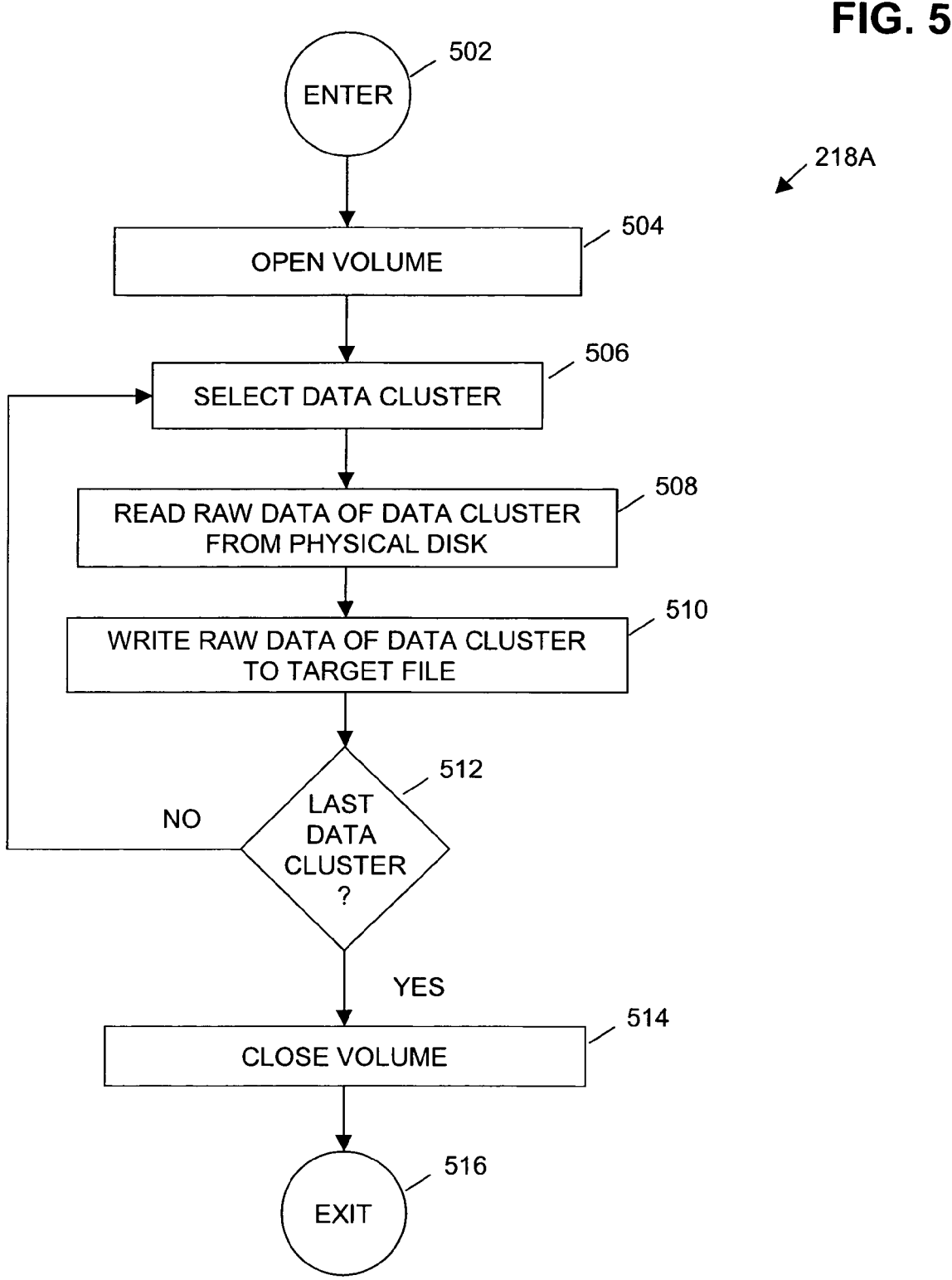
FIG. 5 illustrates a flow diagram of a method for copying the raw data of an inaccessible source file from a physical disk to a target file in accordance with one embodiment of the invention.

FIG. 5 illustrates a flow diagram of a method 218A for copying the raw data of an inaccessible source file from a physical disk to a target file in accordance with one embodiment of the invention. Referring now to FIGS. 2 and 5 together, in one embodiment, execution of file access and scanning application 106 by processor 108 results in the operations of method 218A as described below. In one embodiment, method 218A is entered from operation 216 (FIG. 2B) at an ENTER operation 502, and from ENTER operation 502, processing transitions to an OPEN VOLUME operation 504.

In OPEN VOLUME operation 504, the volume of the physical disk having the data clusters of the inaccessible source file is opened. In one embodiment, the API function ReadFile( ) is called specifying the volume handle. From OPEN VOLUME operation 504, processing transitions to a SELECT DATA CLUSTER operation 506.

Generally viewed, the following operations 506, 508, 510 and 512 form a loop of commands that read each of earlier located data clusters that compose the inaccessible source file on the physical disk, and that write each of the data clusters to the target file. In one embodiment, each of the data clusters is read in order, and each data cluster is written to the target file in order using the target file handle received in operation 216.

In SELECT DATA CLUSTER operation 506, initially a first data cluster of the inaccessible source file at a first location is selected from the location(s) of the data clusters determined in operation 210. In one embodiment, the first data cluster location selected is the first ordered data cluster. From SELECT DATA CLUSTER operation 506, processing transitions to a READ RAW DATA OF DATA CLUSTER FROM PHYSICAL DISK operation 508.

In READ RAW DATA OF DATA CLUSTER FROM PHYSICAL DISK operation 508, in one embodiment, the raw data of the data cluster selected in operation 506 are read from the data cluster location on the physical disk. In one embodiment, the API function ReadFile( ) is called initially specifying the location of the first data cluster, e.g., at a first offset. From READ RAW DATA OF DATA CLUSTER FROM PHYSICAL DISK operation 508, processing transitions to a WRITE RAW DATA OF DATA CLUSTER TO TARGET FILE operation 510.

In WRITE RAW DATA OF DATA CLUSTER TO TARGET FILE operation 510, the data cluster read in operation 508, is written to the target file. In one embodiment, DeviceIOControl( ) is called specifying the parameter FSCTL_WRITE_RAW_ENCRYPTED( ), which allows a write of encrypted raw data to the target file. From WRITE RAW DATA OF DATA CLUSTER TO TARGET FILE operation 510, processing transitions to a LAST DATA CLUSTER check operation 512.

In LAST DATA CLUSTER check operation 512, a determination is made whether the current data cluster location selected in operation 506 is the last location composing the encrypted inaccessible source file. When the current data cluster location is not the last data cluster location composing the encrypted inaccessible source file ("NO"), processing transitions from LAST DATA CLUSTER check operation 512 and returns to SELECT DATA CLUSTER operation 506 with a next data cluster at a next location that is next in the data cluster order being selected.

Referring again to LAST DATA CLUSTER check operation 512, alternatively, when the current data cluster is the last data cluster composing the inaccessible source file ("YES"), the complete contents of the inaccessible source file has been read from the physical disk, e.g., physical disk 114, and written to the accessible target file. From LAST DATA CLUSTER check operation 512, processing transitions to a CLOSE VOLUME operation 514.

In CLOSE VOLUME operation 514, the volume is closed. In one embodiment, the API function CloseHandle( ) is called specifying the volume handle. In some embodiments, if additional files on the volume are to be copied or other operations performed, the volume handle is left open until those operations are completed, and then the volume is closed. From CLOSE VOLUME operation 514, processing transitions to an EXIT operation 516, with processing exiting method 500 and returning to method 200 at operation 220.

Referring back again to FIG. 2, and method 200, in CLOSE TARGET FILE operation 220, the target file is closed. In particular, the target file now contains a complete copy of the raw data, i.e., the raw data contents, of the encrypted inaccessible source file, and the accessible target file has an associated MFT record including a copy of the encryption stream, e.g., the $EFS stream, of the inaccessible source file. In one embodiment, the API function CloseHandle( ) is called specifying the target file handle. From CLOSE TARGET FILE operation 220, processing transitions to an OPEN TARGET FILE operation 222.

In OPEN TARGET FILE operation 222, the target file is opened. In particular, the target file is opened again to allow the operating system to automatically decrypt the copy of the encrypted raw data of the encrypted inaccessible source file present in the accessible target file.

In one embodiment the target file is opened using a call to CreateFile( ) and specifying the target file handle. From OPEN TARGET FILE operation 222, processing transitions to a READ TARGET FILE operation 224.

In READ TARGET FILE operation 224, the target file is read by the operating system and automatically decrypted by the operating system. In one embodiment, the operating system utilizes the $EFS stream in the MFT record associated with the target file to automatically decrypt the copy of the encrypted raw data of the encrypted inaccessible source file present in the target file. In one embodiment, the API function ReadFile( ) is called specifying the target file handle.

Thus, in the present embodiment, the encrypted raw data of the encrypted inaccessible source file is now indirectly accessible through the target file, and is automatically decrypted by the operating system when the target file is read to generate unencrypted data. This allows the unencrypted contents to be further evaluated, such as for the presence of malicious code, as further described herein. From READ TARGET FILE operation 224, processing transitions to a SCAN TARGET FILE operation 228 where the contents of the target file are evaluated for malicious code, or optionally transitions, at operation 226, to a CLOSE TARGET FILE operation 236 (FIG. 2C) with processing exiting method 200 at an EXIT operation 238 further described herein.

Referring now to method 200 and FIG. 2C, in SCAN TARGET FILE operation 228, the unencrypted data of the target file read in operation 224 (FIG. 2B) is scanned for malicious code. Any of a variety of techniques can be used for scanning the unencrypted data for malicious code, for example, known malicious code strings are compared to the unencrypted data of the target file. From SCAN TARGET FILE operation 228, processing transitions to a MALICIOUS CODE DETECTED check operation 230.

In MALICIOUS CODE DETECTED check operation 230, a determination is made whether malicious code was detected in the scan of the unencrypted data in operation 228. In some embodiments, the results of the scan are further evaluated, such as in accordance with malicious code heuristics, and/or exclusion databases.

When a determination is made that malicious code is not detected ("NO"), processing transitions from MALICIOUS CODE DETECTED check operation 230 to CLOSE TARGET FILE operation 236.

In CLOSE TARGET FILE operation 236, the target file is closed. In one embodiment, the API function CloseHandle( ) is called specifying the target file handle. FROM CLOSE TARGET FILE operation 236, processing transitions to EXIT operation 238 with processing exiting method 200. In some embodiments, rather than exiting method 200, processing returns to operation 204.

Referring again to MALICIOUS CODE DETECTION check operation 230, alternatively, upon a determination that malicious code is detected ("YES"), from MALICIOUS CODE DETECTED check operation 230, processing transitions to a TAKE PROTECTIVE ACTION operation 232.

In TAKE PROTECTIVE ACTION operation 232, protective action is taken. In some embodiments, the inaccessible source file is deleted from host computer system 102 (FIG. 1). In some embodiments, the target file and/or the unencrypted data is automatically copied to a text file and sent to a security evaluation center.

In one embodiment, the user is prompted for input prior to taking protective action, e.g., the user is asked for permission to take protective action. From TAKE PROTECTIVE ACTION operation 232, processing optionally transitions to a NOTIFY operation 234, or directly to CLOSE TARGET FILE operation 236.

In optional NOTIFY operation 234, the user of host computer system 102 (FIG. 1), and/or a system administrator of the network, e.g., network 126, are notified of a malicious code detection on host computer system 102. In one embodiment, a record or error message is generated and provided to the user and/or system administrator. In one embodiment, the notification identifies the particular malicious code and/or any protective action taken.

The user and/or administrator are notified using any one of a number of techniques, e.g., by using a pop up window, by generating an e-mail, by writing to a file and/or otherwise by logging the event. Further, in one embodiment, a notification is provided to a security center. From optional NOTIFY operation 234, processing transitions to CLOSE TARGET FILE operation 236.

Referring now again to FIG. 3B and operation 320, as earlier described, Windows NT operating systems implement an error check method in the data clusters of MFT directories in which the last 2 bytes of each sector in a directory data cluster are replaced with a 2 byte fixed pattern from an update sequence array. The original 2 bytes that were replaced with the 2 byte fixed pattern, are stored in an update sequence array.

The operating system checks the 2 byte fixed pattern in the update sequence array, and determines whether the last 2 bytes in each sector of a directory data cluster have the same 2 byte fixed pattern. When each of the last 2 bytes in each sector contains the 2 byte fixed pattern, the operating system determines the directory is good, e.g., not corrupted. However, if the last 2 bytes of each sector in the directory data cluster do not match the 2 byte fixed pattern, the operating system determines there is an error in the directory data cluster.

Conventionally, an update sequence array is located at the beginning of each directory data cluster. The first data element of a directory data cluster is the NTFS_RECORD_HEADER structure. The first two bytes indicate the type of NTFS record. For a directory cluster, this will always be the character equivalent of 'INDX':

const ULONG IndxType=(*((ULONG*)("INDX")));

The UsaOffset field of NTFS_RECORD_HEADER structures gives the offset in bytes from the beginning of the structure to the Update Sequence Array (USA). The first two bytes in the USA are the usaCheck value. This is the value that must be stored in the last two bytes of each sector of the cluster.

Immediately following the usaCheck value is the actual data that needs to replace the usaCheck values at the end of each sector. There will be two bytes for each sector.

The following is an example of the update sequence array:

```
typedef struct
{
    /*
    * The type of NTFS record. When the value of Type
    is considered as a
    * sequence of four one-byte characters, it
    normally spells an acronym
    * for the type.
    *
    * Defined values include:      'FILE'
    *                              'INDX'
    *                              'BAAD'
    *                              'HOLE'
    *                              'CHKD'
    */
    ULONG           Type;
    /*
    * The offset, in bytes, from the start of the
    structure to the Update
    * Sequence Array.
    */
    USHORT          UsaOffset;
```

-continued

```
/*
 * The number of values in the Update Sequence
Array.
 */
    USHORT          UsaCount;
/*
 * The Update Sequence Number of the NTIS record.
 */
    USN             Usn;
} NTFS_RECORD_HEADER, *PNTFS_RECORD_HEADER;
```

Thus, when the directory data clusters of an MFT record are read in operation 318 of method 206A, the last 2 bytes of each sector of the data cluster have been replaced with the 2 byte fixed pattern of the update sequence array. In order to read the original data of the data cluster, the last 2 bytes of each sector need to be restored with the original data from the update sequence array as further described herein with reference to FIG. 6 and method 320A.

Figure 6:
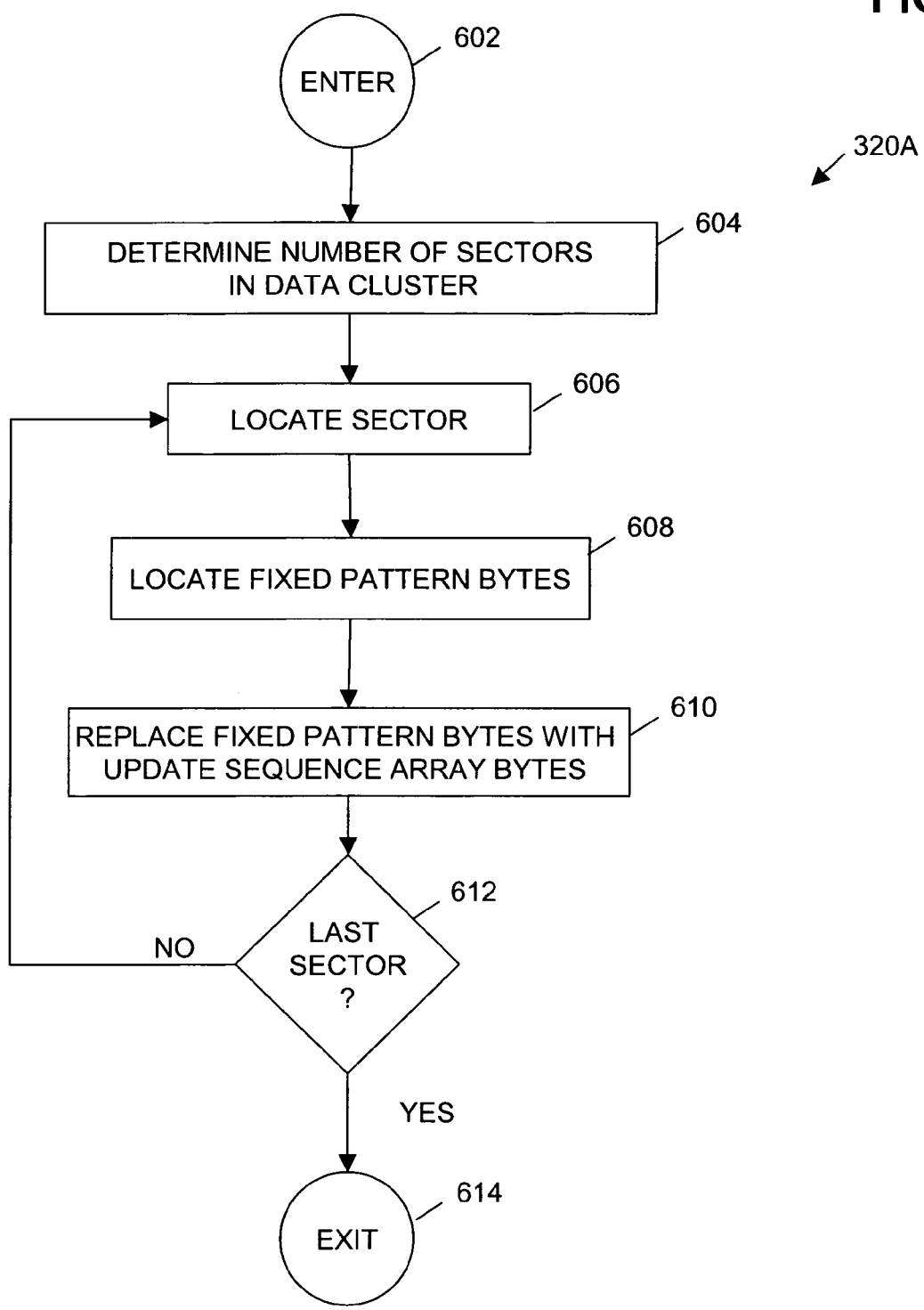
FIG. 6 illustrates a flow diagram of a method for restoring the data in a directory data cluster in accordance with one embodiment of the invention.

FIG. 6 illustrates a flow diagram of a method 320A for restoring the data in a directory data cluster in accordance with one embodiment of the invention. Referring now to FIGS. 3 and 6 together, in one embodiment, execution of file access and scanning application 106 by processor 108 results in the operations of method 320A as described below. In one embodiment, method 320A is entered from operation 318 (FIG. 3) at an ENTER operation 602, and from ENTER operation 602, processing transitions to a DETERMINE NUMBER OF SECTORS IN DATA CLUSTER operation 604.

In DETERMINE NUMBER OF SECTORS IN DATA CLUSTER operation 604, the number of sectors in a directory data cluster is determined. For example, assume that in a given volume a directory data cluster is 4 kilobytes, i.e., 4,096 bytes, and a sector is 512 bytes. In one embodiment, the number of sectors in the directory data cluster is the size of the directory data cluster divided by the size of a sector. Thus, in the present example, the number of sectors per data cluster is 4,096 bytes divided by 512 bytes, which equals 8 sectors. As there is one entry in an update sequence array for each sector, there are 8 entries in the update sequence array for the given directory data cluster.

The 2 byte fixed pattern present at the end of each sector of the directory data cluster needs to be replaced with the corresponding original 2 bytes of each sector that are stored in the update sequence array. From DETERMINE NUMBER OF SECTORS IN DATA CLUSTER operation 604, processing transitions to a LOCATE SECTOR operation 606.

In LOCATE SECTOR operation 606, initially a first sector in the director cluster is located. Locating a sector in a directory data cluster is well known to those of skill in the art and not further described herein to avoid detracting from the principles of the invention. From LOCATE SECTOR operation 606, processing transitions to a LOCATE FIXED PATTERN BYTES operation 608.

In LOCATE FIXED PATTERN BYTES operation 608, the sector located in operation 606 is scanned and the last 2 bytes of the sector having the fixed pattern of the update sequence array are located. From LOCATE FIXED PATTERN BYTES operation 608, processing transitions to a REPLACE FIXED PATTERN BYTES WITH UPDATE SEQUENCE ARRAY BYTES operation 610.

In REPLACE FIXED PATTERN BYTES WITH UPDATE SEQUENCE ARRAY BYTES operation 610, the last 2 bytes of the sector, e.g., the 2 byte fixed pattern, are replaced with the corresponding 2 original bytes stored in the update sequence array thus yielding the original data of the sector. From REPLACE FIXED PATTERN BYTES WITH UPDATE SEQUENCE ARRAY BYTES operation 610, processing transitions to a LAST SECTOR check operation 612.

In LAST SECTOR check operation 612, a determination is made whether the current sector is the last sector in the directory data cluster, e.g., whether there are remaining sectors to be scanned and updated from the update sequence array. Upon a determination that the current sector is not the last sector in the directory data cluster ("NO"), processing transitions from LAST SECTOR check operation 612, and returns to LOCATE SECTOR operation 606, with a next sector in the directory data cluster being located.

Referring again to LAST SECTOR check operation 612, alternatively, upon a determination that the current sector is the last sector of the directory data cluster ("YES"), processing transitions from LAST SECTOR check operation 612 to an EXIT operation 614, with processing exiting method 600 and transitioning to operation 322 of method 300 (FIG. 3B).

As earlier described, one embodiment of the inventions allows a user or application to generate an accessible copy of the raw data of an encrypted inaccessible source file that is automatically decrypted by the operating system when the accessible copy is read. Another embodiment in accordance with the invention allows a user or application to generate an accessible copy of the raw data of a compressed inaccessible source file that is automatically decompressed by the operating system when the accessible copy is read as further described herein with reference to FIG. 7.

Figure 7B:
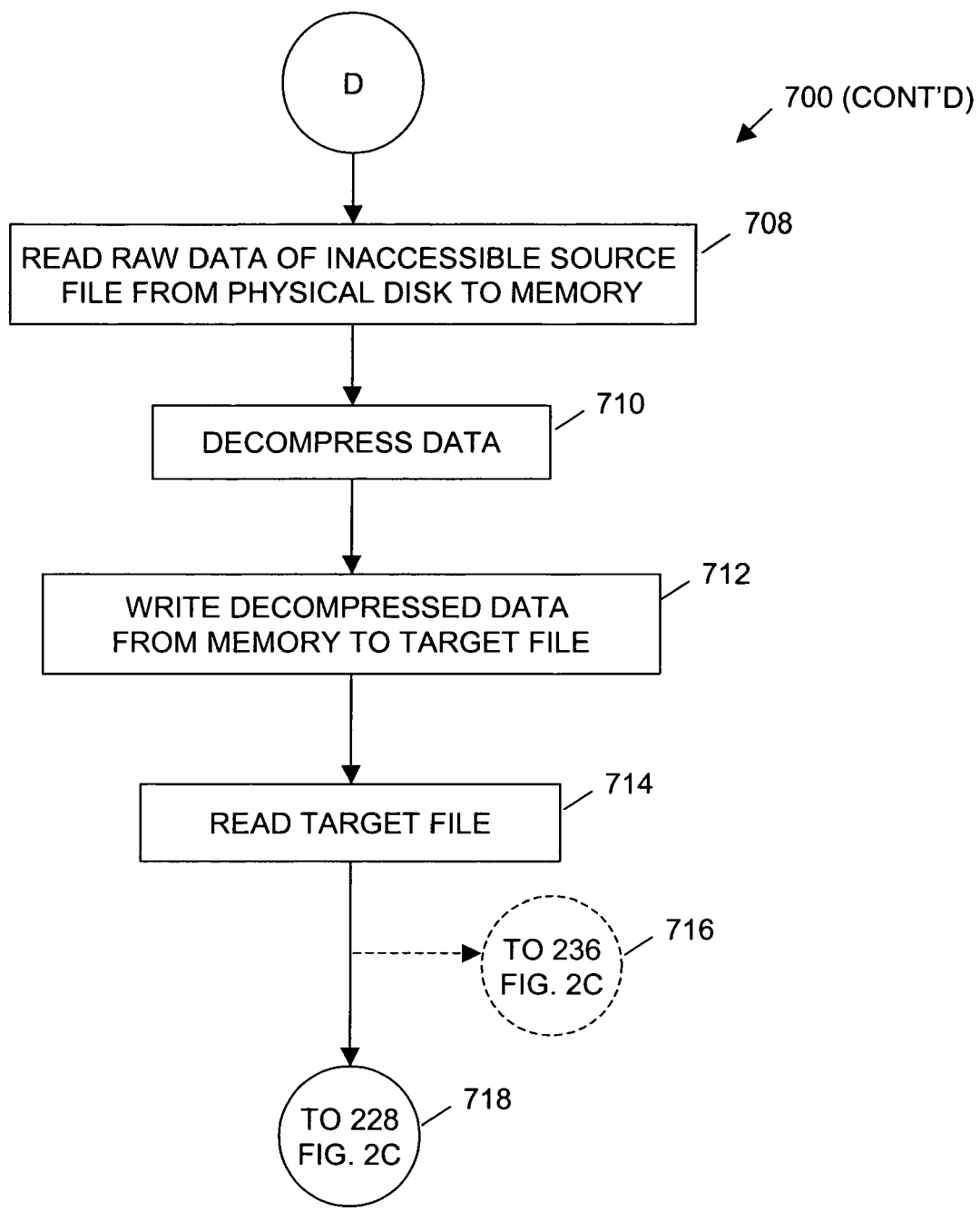
FIG. 7 is a key to FIGS. 7A and 7B and illustrates a flow diagram of a method for generating an accessible copy of a compressed inaccessible source file and scanning the accessible copy for malicious code in accordance with another embodiment of the invention.

FIG. 7 is a key to FIGS. 7A and 7B and illustrates a flow diagram of a method 700 for generating an accessible copy of a compressed inaccessible source file and scanning the accessible copy for malicious code in accordance with another embodiment of the invention. Referring now to FIGS. 2 and 7 together, in one embodiment, execution of file access and scanning application 106 by processor 108 results in the operations of method 700 as described below. In one embodiment, method 700 is entered at an ENTER operation 702, and from ENTER operation 702, processing transitions to DETERMINE FILE PATH OF INACCESSIBLE SOURCE FILE operation 204.

In the present embodiment, operations 204, 206, and 210 (FIG. 2A) are similarly performed as earlier described with reference to method 200, hereby incorporated by reference, excepting that the raw data of the inaccessible source file is compressed rather than encrypted. Thus, in the present embodiment, the inaccessible source file is a compressed inaccessible source file. As used herein, in one embodiment, a compressed inaccessible source file is an inaccessible source file having raw data, i.e., raw data contents, in a compressed state.

As the compressed inaccessible source file is not encrypted, the encryption stream, e.g., the $EFS stream, is not present in the associated MFT record associated with the compressed inaccessible source file, and operation 208 is not performed.

More particularly, in DETERMINE FILE PATH OF INACCESSIBLE SOURCE FILE operation 204, the file path of the compressed inaccessible source file is obtained, and processing transitions to operation 206 in which the MFT record of the compressed inaccessible source file is obtained. From operation 206, processing transitions to operation 210 in which the location(s) of the raw data of the compressed inaccessible source file, i.e., the locations of the data clusters on the physical disk, are determined from the data attribute of the MFT record obtained operation 206. From operation 210, processing transitions to a CREATE TARGET FILE operation 704.

In CREATE TARGET FILE operation 704, a target file is created. In one embodiment, as a target file suitable for encrypted data is not needed for compressed data, the EFS API functions used in creating the target file in operation 212 are not used in the present embodiment.

Rather, in one embodiment, the API function CreateFile( ) is called specifying a name of the target file. The operating system creates a target file and returns a handle to the target file, herein termed the target file handle. From CREATE TARGET FILE operation 704, processing transitions to a RECEIVE TARGET FILE HANDLE operation 706.

In RECEIVE TARGET FILE HANDLE operation 706, file access and scanning application 106 receives the target file handle. From RECEIVE TARGET FILE HANDLE operation 706, processing transitions to a READ RAW DATA OF INACCESSIBLE SOURCE FILE FROM PHYSICAL DISK TO MEMORY operation 708.

In READ RAW DATA OF INACCESSIBLE SOURCE FILE FROM PHYSICAL DISK TO MEMORY operation 708, the compressed data at each of the data clusters identified in operation 210 are read from the physical disk in order into memory, for example, to a memory location on host computer system 102 accessible by file access and scanning application 106. In one embodiment, the API function ReadFile( ) is called successively specifying each of the location(s) of the raw data of the compressed file on the physical disk in order until all the data clusters are read into memory. In one embodiment, an in-memory copy of the raw data of the compressed inaccessible source file is created in memory. From READ RAW DATA OF INACCESSIBLE SOURCE FILE FROM PHYSICAL DISK TO MEMORY operation 708, processing transitions to a DECOMPRESS DATA operation 710.

In DECOMPRESS DATA operation 710, the raw data read into memory in operation 708 is decompressed. In the current embodiment, the data is decompressed in preparation for writing the data to the target file.

In one embodiment, file access and scanning application 106 utilizes a decompression operation to decompress the in-memory copy of the raw data of the compressed inaccessible source file. In one embodiment, an in-memory decompressed copy of the compressed raw data of the compressed inaccessible source file is generated. Decompression of compressed data is well known to those of skill in the art and not further described herein to avoid detracting from the principles of the invention. From DECOMPRESS DATA operation 710, processing transitions to a WRITE DECOMPRESSED DATA FROM MEMORY TO TARGET FILE operation 712.

In WRITE DECOMPRESSED DATA FROM MEMORY TO TARGET FILE operation 712, the decompressed data is written from memory to the target file created in operation 704. In one embodiment, the in-memory decompressed copy of the compressed raw data of the compressed inaccessible source file is written from memory to the target file.

In one embodiment, the API function WriteFile( ) is called specifying the target file handle. When the decompressed data is written from memory to the target file, the operating system automatically compresses the data again. The resulting target file is now an accessible copy of the compressed raw data of the compressed inaccessible source file. From WRITE DECOMPRESSED DATA FROM MEMORY TO TARGET FILE operation 712, processing transitions to a READ TARGET FILE operation 714.

In READ TARGET FILE operation 714, the contents of the target file are read. In one embodiment, the API function ReadFile( ) is called specifying the target file handle. When the operating system reads the contents of the target file, the compressed data is automatically decompressed by the operating system. From READ TARGET FILE operation 714, processing transitions, at operation 718, to SCAN TARGET FILE operation 228 (FIG. 2C) where the decompressed contents of the target file are evaluated for malicious code as earlier described, or optionally transitions, at operation 716, to CLOSE TARGET FILE operation 236, earlier described, with processing exiting method 700 at EXIT operation 238, or returning to operation 204.

Figure 8:
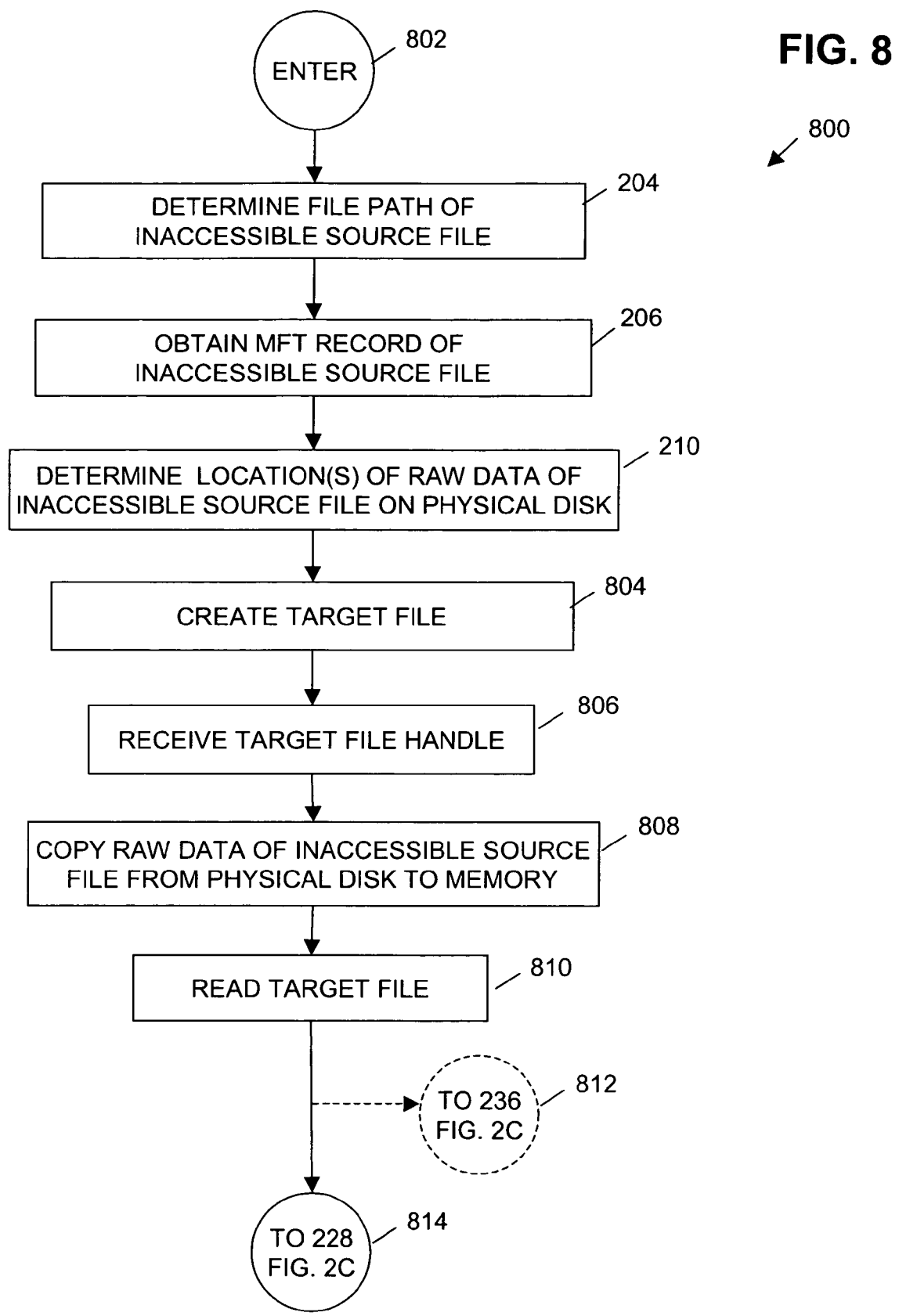
FIG. 8 illustrates a flow diagram of a method for generating an accessible copy of an inaccessible source file and scanning the accessible copy for malicious code in accordance with another embodiment of the invention.

Another embodiment in accordance with the invention allows a user or application to generate an accessible copy of an inaccessible source file in which the raw data are not encrypted and not compressed as further described herein with reference to FIG. 8.

FIG. 8 illustrates a flow diagram of a method 800 for automatically generating an accessible copy of an inaccessible source file and scanning the accessible copy for malicious code in accordance with another embodiment of the invention. Referring now to FIGS. 2 and 8 together, in one embodiment, execution of file access and scanning application 106 by processor 108 results in the operations of method 800 as described below. In one embodiment, method 800 is entered at an ENTER operation 802, and from ENTER operation 802, processing transitions to DETERMINE FILE PATH OF INACCESSIBLE SOURCE FILE operation 204.

Operations 204, 206, and 210 are performed as earlier described with reference to method 200, hereby incorporated by reference, excepting that the raw data of the inaccessible source file is normal data. As used herein, in one embodiment, normal raw data are raw data that are not compressed or encrypted. As the raw data of the inaccessible source file is not encrypted, the encryption stream, e.g., the $EFS stream, is not present in the associated MFT record, and operation 208 is not performed.

More particularly, in operation 204, the file path of the inaccessible source file is obtained, and processing transitions to operation 206 in which the MFT record of the inaccessible source file is obtained. From operation 206, processing transitions to operation 210 in which the location(s) of the raw data of the inaccessible source file, i.e., the locations of the data clusters, are determined from the data attribute of the MFT record obtained operation 206. From operation 210, processing transitions to CREATE TARGET FILE operation 804.

In CREATE TARGET FILE operation 804, a target file is created. In one embodiment, as a target file suitable for encrypted data is not needed for normal data, the EFS API functions used in operation 212 are not used in the present embodiment. Rather, in one embodiment, the API function CreateFile( ) is called specifying a name of the target file. The operating system creates a target file and returns a handle to the target file, herein termed the target file handle. From CREATE TARGET FILE operation 804, processing transitions to a RECEIVE TARGET FILE HANDLE operation 806.

In RECEIVE TARGET FILE HANDLE operation 806, file access and scanning application 106 receives the target file handle. From RECEIVE TARGET FILE HANDLE operation 806, processing transitions to a COPY RAW DATA OF INACCESSIBLE SOURCE FILE FROM PHYSICAL DISK TO TARGET FILE 808.

In COPY RAW DATA OF INACCESSIBLE SOURCE FILE FROM PHYSICAL DISK TO TARGET. FILE operation 808, the raw data of the inaccessible source file is copied from the physical disk to the target file. In one embodiment, the raw data are read from the data clusters and written to the target file as earlier described with reference to operation 218 of method 200, hereby incorporated by reference, excepting that the raw data are normal data and are not encrypted or compressed. FROM COPY RAW DATA OF INACCESSIBLE SOURCE FILE FROM PHYSICAL DISK TO MEMORY operation 808, processing transitions to a READ TARGET FILE operation 810.

In READ TARGET FILE operation 810, the contents of the target file are read. In one embodiment, the API function ReadFile( ) is called specifying the target file handle. From READ TARGET FILE operation 810, processing transitions, at operation 814, to SCAN TARGET FILE operation 228 (FIG. 2) where the contents of the target file are evaluated for malicious code as earlier described, or optionally transitions, at operation 812, to CLOSE TARGET FILE operation 236, earlier described, with processing exiting method 800 at EXIT operation 238, or optionally returning to operation 204.

In one embodiment, method 800 can be used to generate a copy of a running database. For example, assume a copy of a database is needed, but the database is currently running and cannot be taken offline. Another embodiment in accordance with the invention generates a copy of the running database using the operations of method 800 described herein. The copy of the database can then be run on another system. In some instances, the database is adjusted to cure inconsistent states prior to use on the other system.

Although file access and scanning application 106 is referred to as an application, this is illustrative only. File access and scanning application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments have been described for a client-server configuration, an embodiment may be carried out using any suitable hardware configuration or means involving a personal computer, a workstation, a portable device, or a network of computer devices. Other network configurations other than client-server configurations, e.g., peer-to-peer, web-based, intranet, Internet network configurations, are used in other embodiments.

Herein, a computer program product comprises a medium configured to store or transport computer readable code in accordance with the embodiments described herein. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, file access and scanning application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the functionality of file access and scanning application 106 in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of file access and scanning application 106 in accordance with one embodiment can be implemented in a wide variety of computer system configurations. In addition, the functionality of file access and scanning application 106 could be stored as different modules in memories of different devices.

For example, file access and scanning application 106 could initially be stored in server system 130, and then as necessary, a portion of file access and scanning application 106 could be transferred to host computer system 102 and executed on host computer system 102. Consequently, part of the functionality of file access and scanning application 106 would be executed on processor 134 of server system 130, and another part would be executed on processor 108 of host computer system 102. In view of this disclosure, those of skill in the art can implement the various embodiments described herein in a wide-variety of physical hardware configurations using an operating system and computer programming language of interest to the user.

In yet another embodiment, file access and scanning application 106 is stored in memory 136 of server system 130. File access and scanning application 106 is transferred over network 126 to memory 112 in host computer system 102. In this embodiment, network interface 138 and I/O interface 110 would include analog modems, digital modems, or a network interface card. If modems are used, network 126 includes a communications network, and file access and scanning application 106 is downloaded via the communications network.

This disclosure provides exemplary embodiments. The scope of the various embodiments described herein is not limited by these exemplary embodiments. Numerous variations, whether explicitly provided for by the specification or implied by the specification or not, may be implemented by one of skill in the art in view of this disclosure.

In particular, in the above embodiments, the raw data of the inaccessible source file is accessed on the physical disk by opening the particular volume on which the inaccessible source file is stored and then calling DeviceIOControl( ) specifying the volume handle and a specific MFT record. In an alternative embodiment, the volume in which the file is stored is opened, but the API function ReadFile( ) is called and the volume is directly read and parsed until the MFT record of the inaccessible source file is located. In another alternative embodiment, the physical disk is opened and all the volumes are read and parsed until the location of the MFT record associated with the inaccessible source file is determined. In these alternative embodiments, the raw MFT records need to be modified as they are stored on disk in an altered form as a consistency check for the operating system.

What is claimed is:

1. A computer implemented method comprising:
determining a file path of an inaccessible source file, a contents of said inaccessible source file being stored as raw data at one or more locations on a physical disk of a host computer system;
automatically determining said one or more locations on said physical disk at which said raw data composing said inaccessible source file is located, each of said one or more locations including at least a portion of said raw data composing said inaccessible source file, wherein said automatically determining said one or more locations on said physical disk at which said raw data composing said inaccessible source file is located comprises:
automatically accessing a Master File Table (MFT) Record associated with said inaccessible source file; and
automatically determining said one or more locations of said raw data composing said inaccessible source file from said MFT record;
automatically creating an accessible target file;
automatically generating a copy of said raw data of said inaccessible source file in said accessible target file; and
automatically accessing said copy of said raw data of said inaccessible source file in said accessible target file,
wherein said raw data of said inaccessible source file is encrypted data, and further wherein said copy of said raw data of said inaccessible source file in said accessible target file is encrypted data, said method further comprising:
automatically decrypting said copy of said raw data of said inaccessible source file from said accessible target file to generate unencrypted data.

2. The computer implemented method of claim 1, wherein said raw data of said inaccessible source file is compressed data, and further wherein said copy of said raw data of said inaccessible source file is compressed data, said method further comprising: automatically decompressing said copy of said raw data of said inaccessible source file from said accessible target file to generate decompressed data.

3. The computer implemented method of claim 1, further comprising:
automatically scanning said copy of said raw data of said inaccessible source file; and
automatically determining whether malicious code is detected in said copy of said raw data of said inaccessible source file.

4. The computer implemented method of claim 1, further comprising:
automatically scanning said unencrypted data; and
automatically determining whether malicious code is detected in said unencrypted data.

5. The computer implemented method of claim 2, further comprising:
automatically scanning said decompressed data; and
automatically determining whether malicious code is detected in said decompressed data.

6. The computer implemented method of claim 1, wherein said inaccessible source file is a locked file.

7. The computer implemented method of claim 1, wherein said inaccessible source file is a stealthed file.

8. A computer implemented method comprising:
determining a file path of an inaccessible source file, a contents of said inaccessible source file being stored as encrypted raw data at one or more locations on a physical disk of a host computer system;
obtaining an inaccessible source file Master File Table (MFT) record associated with said inaccessible source file;
obtaining an inaccessible source file encryption stream associated with said inaccessible source file from said inaccessible source file MFT record, said inaccessible source file encryption stream for use in decrypting said encrypted raw data of said inaccessible source file;
determining said one or more locations on said physical disk at which said encrypted raw data composing said inaccessible source file is located from said inaccessible source file MFT record, each of said one or more locations including at least a portion of said encrypted raw data composing said inaccessible source file;
creating an accessible target file, said accessible target file having a target file MFT record associated with said accessible target file, said target file MFT record including a copy of said inaccessible source file encryption stream;
generating a copy of said encrypted raw data of said inaccessible source file in said accessible target file;
accessing said copy of said encrypted raw data in said accessible target file; and automatically decrypting said copy of said encrypted raw data in said target file to generate unencrypted data.

9. The computer implemented method of claim 8, further comprising:
scanning said unencrypted data; and
determining whether malicious code is detected in said unencrypted data.

10. The computer implemented method of claim 8, wherein said automatically decrypting said copy of said encrypted raw data is performed by an operating system of said host computer system.

11. A computer implemented method comprising:
determining a file path of an inaccessible source file, a contents of said inaccessible source file being stored as compressed raw data at one or more locations on a physical disk of a host computer system;
obtaining an inaccessible source file Master File Table (MFT) record associated with said inaccessible source file;
determining said one or more locations on said physical disk at which said compressed raw data composing said inaccessible source file is located from said inaccessible source file MFT record, each of said one or more locations including at least a portion of said compressed raw data composing said inaccessible source file;
creating an accessible target file;
generating a copy of said compressed raw data of said inaccessible source file in said accessible target file;
accessing said copy of said compressed raw data in said accessible target file; and
automatically decompressing said copy of said compressed raw data in said target file to generate uncompressed data,
wherein said generating a copy of said compressed raw data of said inaccessible source file in said accessible target file comprises:
reading said compressed raw data at each of said one or more locations from said physical disk into a memory of said host computer system to generate an in-memory copy of said compressed raw data of said inaccessible source file;
decompressing said in-memory copy of said compressed raw data of said inaccessible source file to generate an in-memory decompressed copy of said compressed raw data of said inaccessible source file; and
writing said in-memory decompressed copy of said compressed raw data of said inaccessible source file from said memory to said accessible target file, said writing automatically compressing said in-memory decompressed copy of said compressed raw data of said inaccessible source file to generate said copy of said compressed raw data of said inaccessible source file in said accessible target file.

12. The computer implemented method of claim 11, wherein said automatically compressing is performed by an operating system of said host computer system.

13. The computer implemented method of claim 11, further comprising:
  scanning said uncompressed data; and
  determining whether malicious code is detected in said uncompressed data.

14. A computer system comprising:
  a memory having stored therein a file access and scanning application; and
  a processor coupled to said memory, wherein execution of said file access and scanning application generates a method comprising:
    determining a file path of an inaccessible source file, a contents of said inaccessible source file being stored as raw data at one or more locations on a physical disk of said computer system;
    automatically determining said one or more locations on said physical disk at which said raw data composing said inaccessible source file is located, each of said one or more locations including at least a portion of said raw data composing said inaccessible source file, wherein said automatically determining said one or more locations on said physical disk at which said raw data composing said inaccessible source file is located comprises: automatically accessing a Master File Table (MFT) Record associated with said inaccessible source file; and automatically determining said one or more locations of said raw data composing said inaccessible source file from said MFT record;
    automatically creating an accessible target file;
    automatically generating a copy of said raw data of said inaccessible source file in said accessible target file; and
    automatically accessing said copy of said raw data of said inaccessible source file in said accessible target file,
    wherein said raw data of said inaccessible source file is encrypted data, and further wherein said copy of said raw data of said inaccessible source file in said accessible target file is encrypted data, said method further comprising:
      automatically decrypting said copy of said raw data of said inaccessible source file from said accessible target file to generate unencrypted data;
      automatically scanning said unencrypted data; and
      automatically determining whether malicious code is detected in said unencrypted data.

15. The computer system of claim 14, said method further comprising:
  automatically scanning said copy of said raw data of said inaccessible source file; and
  automatically determining whether malicious code is detected in said copy of said raw data of said inaccessible source file.

16. The computer system of claim 14, wherein said raw data of said inaccessible source file is compressed data, and further wherein said copy of said raw data of said inaccessible source file is compressed data, said method further comprising:
  automatically decompressing said copy of said raw data of said inaccessible source file from said accessible target file to generate decompressed data;
  automatically scanning said decompressed data; and
  automatically determining whether malicious code is detected in said decompressed data.

* * * * *